(12) United States Patent
Alvarez Diez et al.

(10) Patent No.: US 9,175,947 B2
(45) Date of Patent: Nov. 3, 2015

(54) METHOD AND DEVICE FOR DETERMINING A POSITION OF AN OBJECT

(75) Inventors: Cristina Alvarez Diez, Aalen (DE); Frank Hoeller, Aalen (DE); Bernd Spruck, Moegglingen (DE); Marc Tremont, Schorndorf (DE)

(73) Assignee: Carl Zeiss AG, Oberkochen (DE)

( * ) Notice: Subject to any disclaimer, the term of this patent is extended or adjusted under 35 U.S.C. 154(b) by 1281 days.

(21) Appl. No.: 13/061,786

(22) PCT Filed: Aug. 22, 2009

(86) PCT No.: PCT/EP2009/006106
§ 371 (c)(1),
(2), (4) Date: Mar. 2, 2011

(87) PCT Pub. No.: WO2010/025845
PCT Pub. Date: Mar. 11, 2010

(65) Prior Publication Data
US 2011/0157603 A1   Jun. 30, 2011

(30) Foreign Application Priority Data
Sep. 2, 2008 (DE) .......................... 10 2008 045 386

(51) Int. Cl.
*G01B 11/14* (2006.01)
*G01S 5/16* (2006.01)
(Continued)

(52) U.S. Cl.
CPC . *G01B 11/14* (2013.01); *G01S 5/16* (2013.01); *G01S 7/486* (2013.01); *G01S 17/10* (2013.01); *G01S 2013/466* (2013.01)

(58) Field of Classification Search
CPC .................................. G01S 11/08; G01S 5/14
USPC ............... 356/4.01, 3.01, 5.01, 612, 614, 622
See application file for complete search history.

(56) References Cited

U.S. PATENT DOCUMENTS 4,818,100 A   4/1989   Breen
4,856,893 A   8/1989   Breen
(Continued)

FOREIGN PATENT DOCUMENTS

DE   1 031 005    5/1958
DE   44 39 298    11/1994
(Continued)

OTHER PUBLICATIONS

Office Action for DE 10 2008 045 386.2 issued on Jul. 17, 2009 (English translation).
(Continued)

*Primary Examiner* — Gregory J Toatley
*Assistant Examiner* — Iyabo S Alli
(74) *Attorney, Agent, or Firm* — Sand & Sebolt

(57) ABSTRACT

A device for determining a position of an object (25) in a spatial region (28) comprises a light source (3), a light directing device (4-9), at least one reference signal detector (11, 12) and a detector arrangement (13, 14). The light source (3) generates a sequence of light pulses with a repetition rate. The light directing device (4-9) directs the sequence of light pulses into the spatial region (28) and, as a reference signal (20), to the at least one reference signal detector (11, 12). The detector arrangement (13, 14) detects a plurality of light signals (23, 24) which are reflected and/or scattered by the object (25) in the spatial region (28) into a plurality of different directions by reflection and/or scattering of the sequence of light pulses. The evaluation circuit (15) is coupled to the detector arrangement (13, 14) and the at least one reference signal detector (11, 12) and determines a phase difference (67) between the reference signal (20) and a signal component of at least one light signal (23, 24). The phase difference is determined based on the signal component which has a frequency that corresponds to a multiple of the repetition rate.

20 Claims, 11 Drawing Sheets

(51) Int. Cl.
*G01S 7/486* (2006.01)
*G01S 17/10* (2006.01)
*G01S 13/46* (2006.01)

(56) References Cited

U.S. PATENT DOCUMENTS

| | | | |
|---|---|---|---|
| 5,251,000 A * | 10/1993 | Ohmamyuda et al. | 356/5.15 |
| 5,793,483 A | 8/1998 | Zehnpfennig et al. | |
| 7,358,516 B2 | 4/2008 | Holler et al. | |
| 7,440,112 B2 | 10/2008 | Kurokawa et al. | |
| 8,085,388 B2 * | 12/2011 | Kaufman et al. | 356/5.01 |
| 2002/0179866 A1 | 12/2002 | Hoeller et al. | |
| 2008/0074637 A1 | 3/2008 | Kumagai et al. | |
| 2008/0180650 A1 | 7/2008 | Lamesch | |

FOREIGN PATENT DOCUMENTS

| | | |
|---|---|---|
| DE | 101 18 392 | 4/2001 |
| DE | 11 2005 001 980 | 7/2007 |
| EP | 1 903 302 | 3/2008 |

OTHER PUBLICATIONS

Minoshima K. et al., "High-accuracy measurement of 240-m distance in an optical tunnel by use of a compact femtosecond laser," Applied Optics, Optical Society of America, vol. 39, No. 30, Oct. 20, 2000, pp. 5512-5517.

Minoshima K. et al., "Ultrahigh dynamic-range portable distance meter using an optical frequency comb," Conference on Lasers and Electro-Optics, 2006 and 2006 Quantum Electronics and Laser Science Conference, CLEO/QELS 2006. ISBN: 978-1-55752-813-1. DOI: Digital Object Identifier: 10.1109/CLEO.2006.4627906.

* cited by examiner

METHOD AND DEVICE FOR DETERMINING A POSITION OF AN OBJECT

The present invention relates to a device and a method for determining a position of an object in a spatial region. The present invention relates in particular to a device and a method for determining a position of an object using optical measuring techniques.

Determining the position of an object relative to another object or absolutely in a specified space, respectively, has applications in a variety of areas, for example in the control or in the feedback control of various machines and apparatuses in industry, medicine, and entertainment industry. For example, for industrial coordinate measuring machines and robot arms, time-consuming calibrations are frequently required to integrate the mechanical behaviour, such as deflection and torsion, into the measuring and control software, respectively, and to thus take it into consideration when performing a measurement and in control operations, respectively. Such calibration techniques or the feedback control or control, respectively, of a robot arm could be supported by determining a position of the robot arm with a high accuracy.

It is a technical challenge to realize devices and methods in which positions are determined with an accuracy in the micrometer range in spaces having a length of a few meters. This applies in particular when it is intended to determine positions with a high rate and a short signal processing time, to allow determination of a position in real time, and when an adjustment of components of the measuring device is to be carried out in as simple a manner as possible.

Laser trackers, which allow the three spatial coordinates of an object to be determined, combine a laser distance measuring device with a high-precision deflection mirror with double-cardanic suspension. The object position can be determined from the measured distance and the two deflection angles of the deflection mirror. However, such laser trackers require that the deflection mirror is controlled in a precise manner and require exact knowledge of the respective deflection angle of the deflection mirror. The associated actuator represents a considerable cost factor.

In geometrical-optical methods, a light source affixed to the object is, for example, monitored by at least two cameras and the object position is determined therefrom by means of trilateration. However, these methods frequently become imprecise when the distance from camera to object varies strongly.

A system and method for determining a position of two objects in relation to each other is known from DE 101 18 392 A1. The method uses coherence properties of laser radiation for determining a distance, with plural light beams being superposed in a coherent manner.

Laser path length measuring devices allow a distance of an object to be determined. In K. Minoshima and H. Matsumoto, "High-accuracy measurement of 240-m distance in an optical tunnel by use of a compact femtosecond laser", Applied Optics, Vol. 39, No. 30, pp. 5512-5517 (2000), a distance measurement using frequency combs is described. While the measurement can be made with a high precision, it is limited to one dimension.

The present invention has the object to provide an improved device and an improved method for determining a position of an object. In particular, the invention has the object to provide such a device and such a method which allows a fast position determination with a high resolution and which is suitable for determining more than one coordinate of the object.

According to the invention, this object is achieved by devices and a method as recited in the independent claims. The dependent claims define preferred or advantageous embodiments.

The provided device and provided method allow a position of an object to be determined in a spatial region. Here, "determining the position of the object in the spatial region" is generally understood to refer to determining at least two coordinates defining the position of the object, which may be length and/or angle values. The term of position determination used in this manner thus includes the determination of quantities which characterize the location of the object in the space, i.e., the position of a predetermined point of the object in the space, and also, alternatively or additionally, the determination of quantities which characterize the orientation of the object relative to spatial axes, i.e., the position of plural predetermined object points relative to each other.

A device for determining a position of an object in a spatial region in accordance with an aspect comprises a light source, a light directing device, at least one reference signal detector and a detector arrangement as well as an evaluation circuit coupled to the at least one reference signal detector and the detector arrangement. In operation, the light source generates a sequence of light pulses having a repetition rate, with the light pulses having a duration which is short compared to the inverse repetition rate. The light directing device receives the sequence of light pulses and directs a portion of the light intensity of each light pulse of the sequence into the spatial region and another portion of the light intensity of each light pulse, as a reference signal, to the at least one reference signal detector. The detector arrangement is configured such that it can detect a plurality of light signals which are reflected and/or scattered into a plurality of different directions within the spatial region. When, in operation of the device, an object is located in the spatial region, the plurality of light signals includes light which is reflected and/or scattered into plural directions by the object in the spatial region, by means of reflection and/or scattering of the sequence of light pulses directed into the spatial region. Light signals having different directions are in this context understood to be light signals having wave vectors which are not parallel and/or light signals which are reflected and/or scattered starting from points spaced from each other. The evaluation circuit determines a phase shift or a phase difference, respectively, between the reference signal and a light signal detected by the detector arrangement. In order to determine the phase difference, the evaluation circuit uses a signal component of the light signal having a frequency which corresponds to a multiple of the repetition rate.

Here, a spectral component of the light signal, i.e. of the light intensity as a function of time, is referred to as a signal component. The reference signal can essentially have the frequency which corresponds to the multiple of the repetition rate, or the reference signal can have a reference signal component, i.e. a spectral component, having this frequency, with the phase difference being determined as phase difference between the signal component and the reference signal component.

Because the phase difference is determined based on a signal component having a frequency which corresponds to a harmonic of the repetition rate, a high spatial resolution can be attained, because, for a given difference in path lengths between the light signal path and the reference signal path, the higher frequency gives rise to a greater phase difference. For a given phase resolution, the difference in path lengths between the light signal path and the reference signal path, and thus the position of the object on which the light signal has been reflected and/or scattered, can thereby be determined with a higher accuracy. Because the detector arrangement is configured to detect light signals which have been reflected and/or scattered in the spatial region with different wave vectors or from different points of origin, the distance of the object from plural reference points can be determined. The position of the object in the spatial region can be determined based on the thus determined plural distances, for example by means of trilateration.

The evaluation circuit can determine an associated phase difference for each light signal of the plurality of light signals, the phase difference being respectively determined based on a signal component of the respective light signal which has a frequency that corresponds to a multiple of the repetition rate. The position of the object can be determined based on the phase differences associated with the plurality of light signals. With the plural phase differences being respectively determined based on a signal component at a harmonic of the repetition rate, the distance from plural reference points can be determined with higher accuracy.

The plurality of light signals can be detected simultaneously by plural optical detectors, such as photodetectors, or sequentially by one optical detector. It is also possible that plural optical detectors are provided, at least one of which receives light signals of the plurality of light signals in a sequential manner.

The detector arrangement may comprise a plurality of optical detectors which are arranged such that they can respectively detect a light signal of the plurality of light signals. If the sequence of light pulses is irradiated into the spatial region starting from a plurality of reference points, an optical detector may be arranged such that it receives the light which is irradiated into the spatial region from a given reference point and which is retroreflected by the object. Thereby, a distance of the object relative to the associated reference point can be determined based on the light signal detected by an optical detector, and the position of the object can be determined from plural distances.

The light directing device may comprise plural beam splitters in order to direct light into the spatial region from a plurality of reference points. A plurality of optical detectors may be associated with the plurality of beam splitters, with each optical detector receiving the sequence of light pulses which has been directed into the spatial region via the associated beam splitter and which, for example, has been retroreflected by the object therein. In this case, the passage locations of a light beam generated by the light source through the beam splitters serve as reference points for determining the position. The plurality of beam splitters may include at least three beam splitters which are not arranged on a straight line, such that three coordinates of the object can be determined from the three determined distances from the beam splitters, in order to locate the object in the spatial region.

There may also be provided an optical detector which sequentially detects plural light signals from the spatial region. In particular, if different sections of the object which are spaced from each other sequentially reflect light, the distance of the various sections from the position, from which the sequence of light pulses is irradiated into the spatial region, for example, can be determined in this manner. For known relative positions of the object sections relative to each other, the orientation, i.e. the angular position of the object in the spatial region, can be determined therefrom, and/or the location of a point of the object in the spatial region can be determined.

In order to implement a sequential reflection of light on different sections of the object, the device may include a beam interrupter to be mounted on the object, which sequentially conceals different sections of the object. For example, plural retroreflectors spaced from each other and having known relative positions can be mounted to the object, only one of which is sequentially unblocked by the beam interrupter.

The use of plural optical detectors can be combined with the sequential detection of light signals by one or plural of the optical detectors. This is in particular advantageous if a large number of coordinates is to be determined, such as three coordinates determining the angular orientation of the object in addition to the coordinates of a point of the object.

Plural reflectors having wavelength selective reflection properties may also be provided. The device may then include plural light sources for generating plural sequences of light pulses, respectively with light of different wavelengths. The device may further comprise plural detectors in order to detect the light signals reflected into different directions. Dichroic beam splitters may be provided which selectively direct the light signal reflected by one of the reflectors to a detector associated with the reflector.

The light directing device may have at least one light expander for expanding the sequence of light pulses to be directed into the spatial region. By virtue of the expansion, the spatial region into which the light pulses are directed is enlarged, so that a position determination may be made in a larger spatial region.

In order to determine the phase difference for the signal component of a light signal, the evaluation circuit may mix down, or down-convert, this signal component. Advantageously, the down-conversion is implemented such that, while the frequency of the signal component is reduced, the phase difference to be determined remains essentially unaltered by the down-conversion. This may be attained by providing a mixer in the evaluation circuit to mix the signal component of the light signal and a reference signal component of the reference signal. In this case, the reference signal component advantageously also has a frequency which is a multiple of the repetition rate. The frequency of the signal component and the frequency of the reference signal component may for example differ by a fundamental frequency corresponding to the repetition rate, in order to mix down the signal component to the fundamental frequency.

There may also be provided two reference signal detectors for detecting the reference signal, with the mixer being coupled, at an input side, to one of the two reference signal detectors to receive the reference signal component. The evaluation circuit may have a further mixer which is coupled, at an input side, to an output of the mixer and to a further reference signal detector. For such a two-stage mixer arrangement, the requirements imposed on the pass band of band pass filters, which are used for selecting the signal component and the reference signal component, are reduced compared to a one-stage mixer arrangement. Because plural reference signal detectors are provided for detecting the reference signal, the components in the respective signal processing paths of the evaluation circuit can be specifically selected with regard to the reference signal components that are respectively required in the signal processing path. An input amplification of the signals provided by the two reference signal detectors may for example respectively be carried out by an amplifier which is specifically selected with regard to having a good performance characteristic in the frequency range in which the frequency of the reference signal component lies in the respective signal processing path.

The determination of the phase difference by the evaluation circuit can be implemented iteratively such that, for plural signal components of one light signal having different frequencies, an associated phase difference is respectively determined. Signal components having increasingly higher frequencies, i.e. signal components having greater multiples of the repetition rate as frequency, may in this case be selected with increasing iteration count. Thereby, the accuracy with which the position of the object is determined may be iteratively improved. This is advantageous in particular if determining the position of the object requires the position of the object to be already known with a given accuracy.

The device may have a blocking device to prevent detection and/or processing of light signals during a time interval in which no light pulse reflected and/or scattered within the spatial region impinges onto the detector arrangement. The blocking device may for example comprise switches provided in the evaluation circuit, such as transistors, which interrupt a current flow in the signal processing paths for the detector arrangement and/or for the reference signal detectors when no light pulse impinges on the respective detector. The time interval may be selected in dependence on the repetition rate and the expected minimum and maximum signal propagation times of a light pulse. The signal-to-noise ratio may be improved by virtue of the blocking device.

The light source may comprise a short pulse laser which may be pumped electrically or optically, for example. Any other suitable signal source may also be used which is capable of outputting with a high precision an optical signal that has a fundamental frequency and pronounced harmonic waves, i.e. high harmonics of the fundamental frequency.

The device may be used in all fields of application in which the position of an object in a space is to be determined. The device may for example be configured as an industrial coordinate measuring machine or as a device for determining a position of a robot.

According to another aspect, a detection and evaluation device for determining a distance of an object is provided. This detection and evaluation device may be used to determine the distance of an object from one of plural reference points in a device for determining an object position, for example, but may also be used in any other application for determining distances, in particular also distance determination in one spatial dimension. The detection and evaluation device comprises a first reference signal detector and a second reference signal detector as well as a detector arrangement and an evaluation circuit coupled therewith. The first and second reference signal detectors are respectively configured to receive a reference signal which includes a sequence of light pulses having a repetition rate. The detector arrangement is configured to detect a light signal reflected and/or scattered by the object, the light signal including the sequence of light pulses with a time shift. The evaluation circuit is configured to determine a phase difference between the reference signal and a signal component of the light signal which has a frequency corresponding to a multiple of the repetition rate.

As described above, the accuracy of the distance determination may be improved for a predetermined phase resolution because the phase difference of a signal component, the frequency of the signal component corresponding to a multiple of the fundamental frequency of the frequency of light pulses, is determined. With not only one, but two reference signal detectors being provided, the associated signal processing paths in the evaluation circuit may specifically be selected with regard to which frequency components are required in the respective signal processing paths.

The evaluation circuit may for example have a first filter in a first signal path which is coupled to the first reference signal detector and a second filter in a second signal path which is coupled to the second reference signal detector, a pass band of the first filter being different from a pass band of the second filter. In this case, the other components in the first and second signal processing paths may be specifically selected with regard to the pass band of the first and second filters, respectively. For example, it is not required that input side amplifiers in the first and second signal paths have a good performance characteristic over the full spectral range which covers both the first and the second pass band.

The evaluation circuit may comprise a first mixer coupled, at an input side, to the detector arrangement and to the first reference signal detector, and a second mixer coupled, at an input side, to an output of the first mixer and to a second reference signal detector. The light signal detected by the detector arrangement can thereby be mixed down to a low frequency, such as the fundamental frequency of the sequence of light pulses, in a two-stage manner. This allows band pass filters to be used in the evaluation circuit, wherein at high frequencies the requirements on the width of a pass band are less strict as compared to a one-stage down-conversion.

According to a further aspect, a method for determining a position of an object in a spatial region is provided. In the method, a sequence of light pulses with a repetition rate is irradiated into the spatial region. A plurality of light signals is detected, which are reflected and/or scattered into a plurality of different directions due to reflection and/or scattering of the irradiated sequence of light pulses by the object within the spatial region. A phase difference between the irradiated sequence of light pulses and a signal component of at least one detected light signal is determined. The signal component is in this case selected such that its frequency corresponds to a multiple of the repetition rate.

As has been explained in connection with the device for determining a position, distances of the object from plural reference points, and thus its position, may be determined with this method. As a signal component having a frequency which corresponds to a multiple of the repetition rate is used for determining the phase difference, the accuracy of position determination is enhanced.

In order to determine the position of the object, an associated phase difference may be determined for each light signal of the plurality of light signals, based on a signal component of the respective light signal which has a frequency corresponding to a multiple of the repetition rate. In this case, the frequencies of the signal components which are used to determine the phase difference may be selected to be different from one detector to another detector. For example, for a light signal detected by a first detector, a signal component having a frequency which is a first multiple of the repetition rate may be evaluated, while for the light signal detected by a second detector, a signal component having a frequency which is a second multiple of the repetition rate may be evaluated, for example if the requirements on the accuracy of position determination are different along different coordinate axes. The position of the object may then be determined based on the phase differences associated with the plurality of light signals.

It is also possible that more phase differences are determined than are actually required for calculating the position of the object, for example by trilateration. This makes it possible to set up an over-determined system of equations for the position of the object in order to enhance the accuracy of position determination. In this case, methods can be used as are known, for example, from position determination in the global positioning system (GPS), to determine the position of the object based on a plurality of distance values from a plurality of reference points.

The sequence of light pulses may be irradiated into the spatial region from a plurality of irradiation positions which are not arranged on a straight line. In this case, the light pulses do not need to be generated at the irradiation positions. The light pulses may, for example, be received at the irradiation positions and may be directed into the spatial region. Such a geometry allows the position of a point of the object to be determined in the spatial region. An optical detector may respectively be provided to receive light which has been irradiated into the spatial region from one of the irradiation positions and has been reflected and/or scattered by the object therein.

As has already been described in connection with the device for determining a position, the plurality of light signals may also be detected sequentially. Detecting the plurality of light signals may also be implemented such that, while plural detectors are provided for detecting the light signals, signals from the spatial region are detected in a sequential manner at one or several of the detectors, the signals being evaluated separately in order to obtain additional information, for example on the orientation of the object. In order to sequentially receive signals from different points on the object, which are spaced from each other, a controllable beam interrupter may be provided on the object. The beam interrupter may, for example, selectively unblock only one of plural retroreflectors arranged on the object. It is also possible that wavelength-selective reflectors are used.

To determine the phase difference of the signal component to a reference signal, the signal component may be mixed down to a lower frequency to allow the phase difference to be determined on a low-frequency signal. For down-conversion, the signal component may for example be mixed with a reference signal component of the reference signal, the frequency of which is also a multiple of the fundamental frequency of the sequence of light pulses. The signal component may be subjected to a multi-stage mixing process in order to mix it down to a low frequency.

To determine the position, for a detected light signal an associated phase difference may iteratively be determined for plural signal components having increasing frequencies. Thereby, the accuracy of position determination may be increased from iteration to iteration. At least one of the plural signal components has a frequency which corresponds to a multiple of the repetition rate.

In order to improve a signal-to-noise ratio, the detection of light signals and/or a further signal processing of detected light signals may be suppressed in a time interval in which no light pulse can be detected. The time interval is determined based on the repetition rate and minimum and maximum expected signal propagation times.

The method can be performed with a device according to an embodiment of the invention.

The devices and methods according to various embodiments of the invention may generally be used for determining object positions in a spatial region. Measuring applications in industrial plants, such as in automated production plants or transportation installations or the like, are an exemplary field of application. Embodiments of the invention are however not limited to these applications.

In the following, the invention will be explained in more detail with the aid of embodiments with reference to the accompanying drawing.

FIG. 1 is a schematic representation of a device according to an embodiment.

FIG. 2A exemplarily shows a sequence of light pulses as a function of time, and FIG. 2B schematically shows a Fourier spectrum of the sequence of light pulses of FIG. 2A.

FIG. 3 shows a detection and evaluation device according to an embodiment.

FIGS. 4A and 4B schematically show signals which occur in the detection and evaluation device of FIG. 3.

In the following, embodiments of the invention will be explained in more detail. Features of the various embodiments may be combined with each other unless this is explicitly excluded in the following description. While some embodiments are described in the context of specific applications, such as determining a position in industrial installations, the invention is not limited to these applications.

Figure 1:
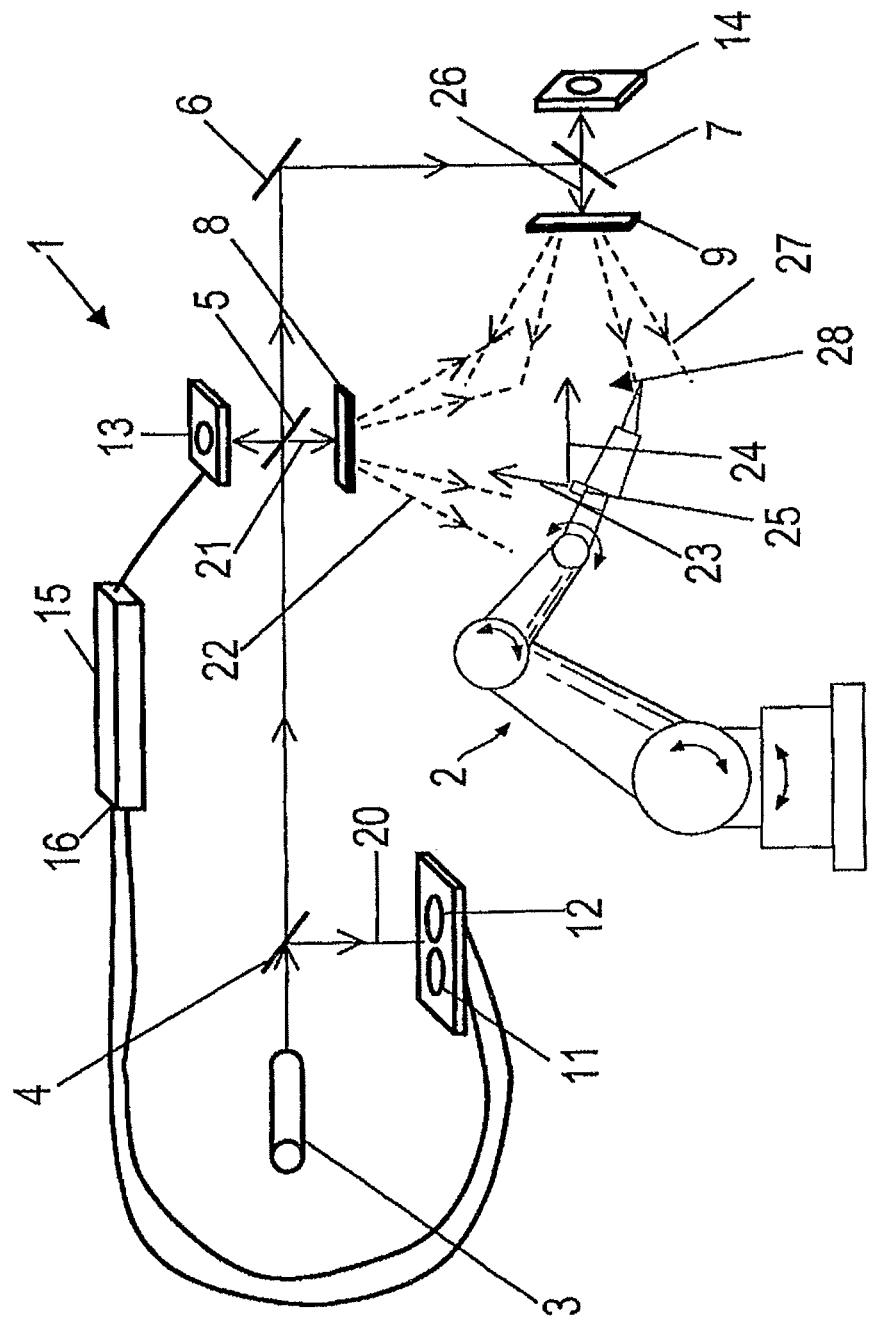

FIG. 1 is a schematic representation of a device 1 for determining a position of an object according to an embodiment. The device 1 is shown in the context of an exemplary application, in which the position of a component of a robot arm 2, which is provided with a reflector 25, is determined, but may also be used in other environments and in other applications.

The device 1 comprises a light source 3 which generates a sequence of short light pulses with a repetition rate, a light directing device which is constituted by a plurality of optical elements 4-9, a pair of reference signal detectors 11, 12 having a first reference signal detector 11 and a second reference signal detector 12, a detector arrangement having plural optical detectors 13, 14 and an evaluation circuit 15. The light directing device receives the sequence of light pulses and directs the sequence of light pulses to the pair of reference signal detectors 11, 12 and into a spatial region generally designated at 28, in which the position of the reflector 25 attached to the robot arm 2 is to be determined. For simplicity, the light directed by the light directing device to the reference signal detectors 11, 12 and into the spatial region 28 will also be referred to as the sequence of light pulses, it being apparent that respectively only a portion of the light pulse intensity generated by the light source 2 is directed to the reference signal detectors 11, 12 and into the spatial region 28, respectively. The sequence of light pulses is reflected in the spatial region by the reflector 25 located on the robot arm 2. The reflected sequence of light pulses is detected by the detectors 13, 14. The evaluation circuit 15 determines, based on the signals from the reference signal detectors 11, 12 which are received at a reference signal input 16 and based on the signals from the detectors 13, 14, a phase relation of signal components of the light signals detected at the detectors 13, 14, which is related to a propagation time of the light pulses in the spatial region 28 and thus to the distance of the reflector 25 from different elements of the light directing device. Thereby, the position of the reflector 25 can be determined. As will be described in more detail, the determination of the phase relation by the evaluation circuit 15 is based on signal components of the light signals detected at the detectors 13, 14 having a frequency which is a multiple of the repetition rate.

The detectors 13, 14 and the reference signal detectors 11, 12 are for example configured as photodetectors and detect the incident light intensity.

While, for reasons of clarity, only two beam splitters 5, 7 from which light is directed into the spatial region 28 and two detectors 13, 14 associated therewith are shown in FIG. 1, light may also be directed into the spatial region in which the position of the object is to be determined from more than two different positions. If all three spatial coordinates of the retroreflector 25 are to be determined, the sequence of light pulses may be directed into the spatial region 28 from at least one further irradiation position which is not located on a straight line defined by the beam passage points on the beam splitters 5 and 7.

In the following, the operation of various components of device 1 will be explained in more detail.

The light source 3 generates an optical signal which is modulated with a periodic function and which has a fundamental frequency f0 as well as pronounced components of harmonics of the fundamental frequency f0, i.e. pronounced frequency components having frequencies which are multiples of f0. Such a signal is, for example, generated by a short pulse laser which generates a sequence of light pulses in a well-defined interval T0=1/f0, i.e. with a repetition rate f0, with the duration of each pulse being short compared to the interval T0 between successive pulses.

FIG. 2A exemplarily shows such a sequence of short light pulses 31, wherein the output power P of the light source 3 is shown as a function of time t. The interval T0 between successive pulses is indicated with reference sign 32, while the duration of each light pulse is indicated with reference sign 33. The duration of each light pulse may be very short compared to the interval T0 between successive light pulses, for example on the order of $1 \cdot 10^{-5}$. In the device 3, the repetition rate f0 and the duration of each pulse may be suitably selected in dependence on a desired measurement accuracy in determining the position, an initial uncertainty on the position of the object, and the signal component of the light signal detected at the detectors 13, 14, for which the phase relation is to be determined, or based on additional factors. If the $n^{th}$ harmonic of f0 is to be used for determining the phase difference, the duration of each light pulse and the interval T0 between successive light pulses are selected such that the sequence of light signals output by the light source 3 still has a sufficient spectral weight at frequency n·f0. While a sequence of square pulses is exemplarily shown in FIG. 2A, other suitable pulse shapes may also be chosen, for example a square of a hyperbolic secans or a Gauss function.

FIG. 2B exemplarily shows a frequency spectrum 35 of a sequence of light pulses which is generated with a repetition rate f0, with the duration of each light pulse being short compared to T0=1/f0. The frequency spectrum 35 has a number of peaks at a constant frequency spacing f0, which is schematically indicated at reference sign 36. The spectral weight of the individual peaks decreases towards higher frequencies, the decrease rate being determined by the ratio of the time interval between successive light pulses and the light pulse duration. For the light source 3 of the device 1 these quantities are selected such that the spectral weight of the frequency component 37 having frequency n·f0, which is used for determining phase relations, is sufficiently large in the sequence of light pulses to perform a phase measurement.

Figure 2:
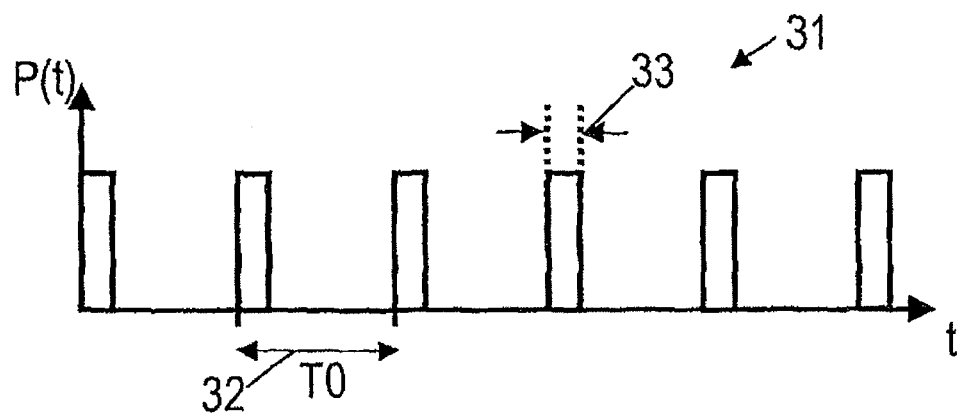
Figure 2:
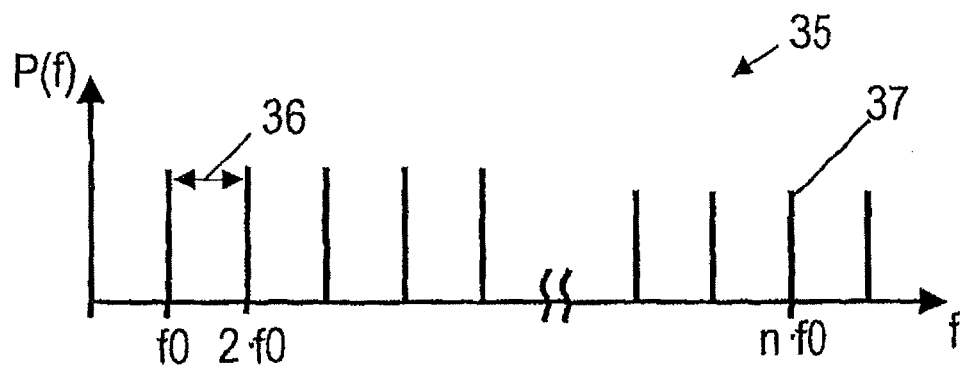

A sequence of light pulses as schematically shown in FIG. 2 can be generated by various lasers which are configured for generating short light pulses. In particular, optical frequency synthesizers may be used. For example, an electrically pumped diode laser, such as a q-switched laser, a gain-switched laser, an active or passive mode-locked laser or a hybrid mode-locked laser, or a mode-locked surface emitting laser having a vertical cavity ("vertical-cavity surface emitting laser", VCSEL) may be used as a light source 3. An optically pumped laser may also be used as light source 3, for example a passive mode-locked surface emitting laser having an external vertical cavity ("vertical external cavity surface emitting lasers", VECSEL) or a laser based on a photonic-crystal-fiber (photonic-crystal-fiber laser). Exemplary pulse durations of the light source 3 lie in a range from 100 fs to 100 ps. Exemplary repetition rates lie in a range from 50 MHz to 50 GHz. Exemplary average powers lie in a range from 1 mW to 10 W. Exemplary values for pulse jitter lie between 10 fs and 1 ps effective (square mean).

As shown in FIG. 1, the sequence of light pulses output by the light source 3 is directed to the reference signal detectors 11, 12 and into the spatial region 28 by the light directing device. In the device 1, the light directing device comprises plural beam splitters 4, 5 and 7, a mirror 6 and beam expanders 8, 9, which are associated with the beam splitters 5 and 7, respectively. The beam splitter 4 receives the sequence of light pulses from the light source 3. A partial beam 20 of the sequence of light pulses is directed by the beam splitter 4 to the reference signal detectors 11, 12 as a reference signal. If required, an optical element for beam splitting, in particular a beam splitter, can be arranged downstream of the beam splitter 4 to ensure that the partial beam 20 impinges both onto the reference signal detector 11 and onto the reference signal detector 12. A further partial beam of the sequence of light pulses is transmitted by the beam splitter 4 and impinges onto the beam splitter 5. The beam splitter 5 directs a partial beam 21 of the sequence of light pulses via the beam expander 8 into the spatial region 28, with the beam expander 8 expanding the partial beam 21 into a light cone 22. A further partial beam is transmitted by the beam splitter 5 and is directed via the mirror 6 to a beam splitter 7. The beam splitter 7 directs a partial beam 26 of the sequence of light pulses via the beam expander 9 into the spatial region 28, with the beam expander 9 expanding the partial beam 26 into a light cone 27. A portion of the light beam received from the mirror 6, which is transmitted by the beam splitter 7, may be directed towards the spatial region 28 by a further beam splitter which is not shown in FIG. 1. The spatial region 28, in which the position of the object can be determined, corresponds to the overlap region of the various light cones 22, 27. If the sequence of light pulses is directed towards the spatial region in which the object position is to be determined from more than three positions, the spatial region in which the position of the object can be determined is the union of all overlap regions of at least three different light cones, which are irradiated starting at at least three different points of origin that are not located on a straight line.

The sequence of light pulses directed into the spatial region 28 in the light cone 22 via the beam splitter 5 and the beam expander 8 impinges onto the retroreflector 25 and is reflected back towards the light expander 8 by the retroreflector. The light reflected back towards the light expander 8 by the retroreflector 25 constitutes a first light signal 23, which is directed onto the detector 13 via the light expander 8 and the beam splitter 5. The sequence of light pulses directed into the spatial region 28 in the light cone 26 via the beam splitter 7 and the light expander 9 impinges onto the retroreflector 25 and is reflected back towards the light expander 9 by the retroreflector. The light reflected back towards the light expander 9 by the retroreflector 25 constitutes a second light signal 24, which is directed onto the detector 14 via light expander 9 and beam splitter 7. If the retroreflector 25 is located in the light cone of further combinations of beam splitter, light expander and detector, corresponding further light signals are reflected by the retroreflector 25 and are directed onto the respective detector via the light expander and beam splitter in a corresponding manner.

The light directing device which directs the sequence of light pulses into the spatial region 28 and the detectors 13, 14 of the detector arrangement are arranged such that the light signal 23 reflected towards detector 13 is reflected into a different direction than the light signal 24 reflected towards detector 14.

The retroreflector 25 provided on the robot arm 2 may, for example, be configured as a corner cube reflector ("Corner Cube Reflector", CCR), as a triple prism or as a cat-eye reflector or ball lens, respectively. For a corner cube reflector and triple prism, the light is reflected back parallel to the incident beam direction. A divergent bundle of rays remains divergent. For a cat-eye reflector and a ball lens, respectively, these retroreflectors may be optimized for a given distance such that the reflected bundle of rays is essentially reflected back into itself, whereby a higher signal level is available at the detector.

A small scattering element which is clearly distinguished from its environment with regard to its scattering behaviour may also be used instead of a retroreflector, to scatter light from the relevant point of the object towards the detectors. The small element should scatter light strongly, in order to have a usable signal at the detector which can be distinguished from the noise of the scattering environment.

The light signals 23 and 24 are detected by the detectors 13 and 14, respectively. The detectors 13, 14 and reference signal detectors 11, 12 are configured as photo receivers. The detectors 13 and 14 detect the light power of the sequence of light pulses incident thereon, which propagates via the beam splitter 5 and 7, respectively, associated with detectors 13 and 14 to the retroreflector 25 and back therefrom to the detectors 13 and 14, respectively. The different optical path lengths of a light pulse to propagate to one of the reference signal detectors 11, 12 on the one hand, and, after reflection at the retroreflector 25, to one of the detectors 13 and 14, respectively, on the other hand gives rise to a time delay $\tau_1$ and $\tau_2$, respectively, between the arrival of one and the same light pulse at one of detectors 13 and 14, respectively, and at the reference signal detectors 11, 12. The time delay is equal to the difference in optical path length of the light paths divided by the speed of light c. As typically only a small portion of the light directed into the spatial region 28 is reflected by the retroreflector 25, the signal at the detectors 13, 14 is attenuated compared to the reference signal at the reference signal detectors 11, 12.

The difference in path lengths includes, on the one hand, segments which depend on the geometry of the device, in particular on the distances between the beam splitters 5, 7 and the beam splitter 4 as well as the distances between the beam splitters 4, 5, 7 and the detectors 13, 14 and the reference signal detectors 11, 12, respectively, taken in each case along the optical path, and, on the other hand, a segment which, for the light signal detected at the detector 13, depends on the optical path length between the beam splitter 5 or the virtual point of origin of the light cone 22 and the retroreflector 25, and which, for the signal detected at the detector 14, depends on the optical path length between the beam splitter 7 or the virtual point of origin of the light cone 22 and the retroreflector 25. As the part of the difference in path lengths which depends on the geometry of the device is known for a known geometry of the device 1, the optical path length travelled by the light pulse between the beam splitter 5 and the retroreflector 25 and, thus, the distance of the retroreflector 25 from the beam passage point of the beam splitter 5 or from the virtual point of origin of the light cone 22, respectively, can be determined by measuring the time shift $\tau_1$ between the light signal 23 at the detector 13 and the reference signal 20 at the reference signal detectors 11, 12. Similarly, the optical path length travelled by the light pulse between the beam splitter 7 and the retroreflector 25 and, thus, the distance of the retroreflector 25 from the beam passage point of the beam splitter 7 or from the virtual point of origin of the light cone 27, respectively, can be determined by measuring the time shift $\tau_2$ between the light signal 24 at the detector 14 and the reference signal 20 at the reference signal detectors 11, 12.

The detectors 13 and 14 as well as the reference signal detectors 11, 12 are coupled to the evaluation circuit 15, which determines a phase difference between the light signals 23, 24 and the reference signal 20. As will be explained in more detail in the following, the evaluation circuit 15 of the device 1 determines the phase difference between the light signals 23, 24 and the reference signal 20 for a signal component having a frequency which essentially is a multiple of the repetition rate.

As described with reference to FIG. 2 for the sequence of light pulses generated by the light source, the sequence of light pulses received at the detectors 13, 14 has a plurality of harmonics, the frequencies of which are multiples of the repetition rate f0:

$$f_i = i \cdot f0, \quad (1)$$

with i being a natural number greater than 1 and f0 being the repetition rate of the light source 3. A characteristic value for frequencies which still have a significant spectral weight in the Fourier representation of the light power received by the detectors 13, 14 as a function of time is given by the quotient of the interval T0 between successive light pulses and the characteristic duration of a light pulse.

In the following, the signal processing is exemplarily explained in more detail for the light signal 23 detected by the detector 13. The explanations apply correspondingly also to each other light signal which propagates from the retroreflector to a detector of the detector arrangement.

A temporal shift $\tau$ between the light signal 23 and the reference signal 20 received at the reference signal detectors 11, 12 results in that a signal component having a frequency of $f_i$ of the signal received at the detector 13 has a phase shift relative to a reference signal component having a frequency of $f_i$ of the reference signal 20 received at the reference signal detectors 11, 12, with the phase shift being $$\Delta \phi_i = 2 \cdot \pi \cdot f_i \cdot \tau = 2 \cdot \pi \cdot i \cdot f0 \cdot \tau \quad (2a)$$

$$= 2 \cdot \pi \cdot i \cdot f0 \cdot (d/c). \quad (2b)$$

Here, d denotes the path length difference between a light path which passes from the beam splitter 4 via the retroreflector 25 to the detector 13 and a light path which passes from the beam splitter 4 to the reference signal detectors 11, 12.

If an estimation value dS for the path length difference d is already known which approximates the latter with an accuracy of $c/(i \cdot f0)$, so that $$|d - dS| < c/f_i = c/(i \cdot f0), \quad (3)$$

based on dS, the part of the phase shift on the right-hand side of Equation (2a) can be determined which is an integer multiple of $2 \cdot \pi$. Based on dS, an integer number m is determined, so that $$d = d' + m \cdot c/f_i, \text{ wherein } |d'| < c/f_i. \quad (4)$$

Consequently, $$\Delta\phi_i' = \Delta\phi_i - 2 \cdot \pi \cdot m \quad (5)$$
$$= 2 \cdot \pi \cdot i \cdot f0 \cdot (d'/c)$$

is a value lying within the interval from 0 to $2 \cdot \pi$ which can be determined by measuring the phase relation between an output signal of the detector 13 and an output signal of one of the reference signal detectors 11, 12. The quantity d' which can then be determined according to $$d' = c \cdot \Delta\phi_i'/(2 \cdot \pi i \cdot f0) \quad (6)$$

results in an improved value for the path length difference d in accordance with Equation (4). With the two quantities $\Delta\phi_i'$ and $\Delta\phi_i$ differing only by an integer multiple of $2 \cdot \pi$ which is irrelevant for determining the phase difference, both quantities will be referred to as phase difference in the following and no distinction will be made between them.

For a given measurement accuracy for a phase difference, which will be referred to as phase resolution in the following, the measurement accuracy for the path length difference and thus the axial resolution can be enhanced, because a value i>1, typically i>>1, is selected in the device and the method according to embodiments of the invention to determine the phase difference.

For illustration it will be assumed that the phase resolution is $2 \cdot >/1000$ and that f0=100 MHz. Then, the axial resolution is 3 mm/i and becomes smaller with increasing frequency of the signal component, i. For example, an axial resolution of approximately 4.1 µm is reached for i=700. Therefore, the axial resolution can be enhanced by determining the phase difference based on a signal component of the light signal 23 having a frequency which is a multiple of the repetition rate, frequently a high multiple of the repetition rate, i.e. having a frequency which is the repetition rate multiplied by a factor i>1, wherein typically a value i>>1 is selected. The signal component, based on which the phase difference is determined, is selected such that it has a frequency which is as high as possible and at which the sequence of light pulses still has sufficient spectral weight, and which allows a signal processing by the components of the evaluation circuit 15 configured as a high frequency circuit.

The evaluation circuit 15 may determine the phase difference by mixing several harmonics with each other. By appropriately selecting the harmonics and by mixing a signal component of the light signal received at the detector 13 with a reference signal component of a reference signal received by the reference signal detectors 11, 12, a mixing product can be generated which has a relatively low frequency, but includes a phase difference of the harmonic wave. Thereby, it becomes possible to perform a phase measurement at low frequencies instead of the original requirement to measure short propagation times.

Figure 3:
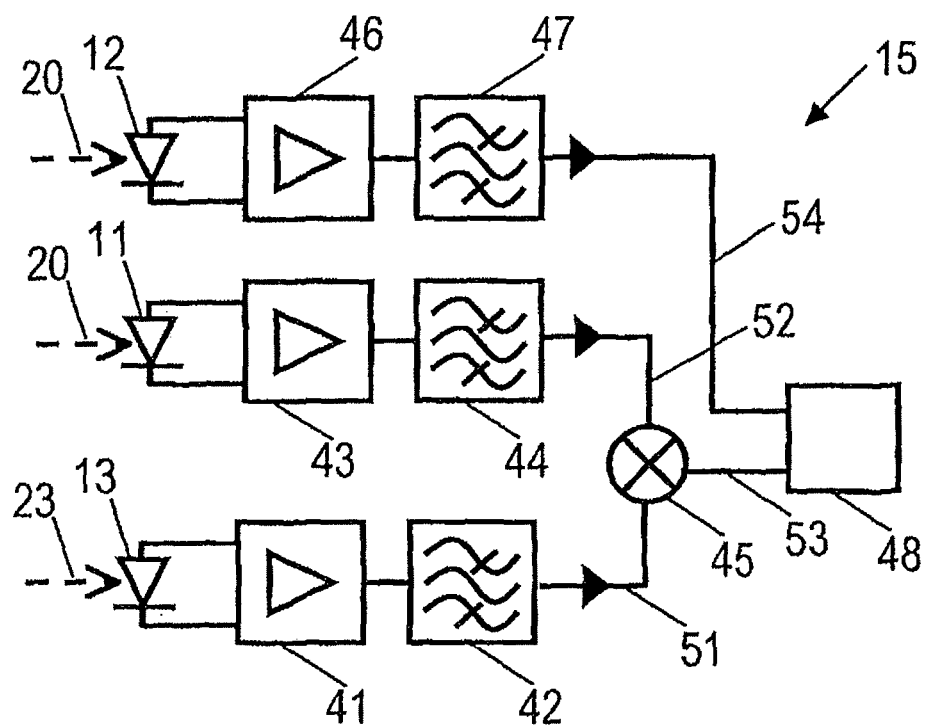

FIG. 3 shows a schematic block circuit diagram of a detector and evaluation circuit according to an embodiment. The evaluation circuit 15 of the device 1 of FIG. 1 can be configured as shown in FIG. 3. However, the detector and evaluation device explained with reference to FIG. 3 may be used not only for determining a position in a three-dimensional space, but also for a distance measurement, i.e. in a one-dimensional distance determination. Further, the configuration of the evaluation circuit 15 shown in FIG. 3 represents only one of plural possible configurations.

Even though only the processing of the light signal from the detector 13 is explained with reference to FIG. 3, the signals of plural detectors can be processed correspondingly, with a correspondingly greater number of signal processing paths being provided. The detector 13 and the reference signal detectors 11, 12 are also shown in FIG. 3 for illustration.

The evaluation circuit 15 comprises a signal processing path for an electrical signal output by the detector 13, which represents the light signal detected by the detector 13, the processing path having an input-side amplifier 41 and a band pass filter 42. The evaluation circuit 15 further comprises a signal processing path for an electrical signal output by the first reference signal detector 11, which represents the reference signal detected by the first reference signal detector 11, the processing path having an input-side amplifier 43 and a band pass filter 44, and a signal processing path for an electrical signal output by the second reference signal detector 12, which represents the reference signal detected by the second reference signal detector 12, the processing path having an input-side amplifier 46 and a band pass filter 47. The detectors 11-14 may respectively be configured as photodetectors. As the signals output by the detectors and by the reference signal detectors, respectively, represent the optical signals incident upon them and are indicative of the light intensity as a function of time, the signals output by the detectors and reference signal detectors, respectively, are referred to in the same way as the detected optical signals, i.e. as detected "light signal" and "reference signal", respectively, with the signals processed by the evaluation circuit being electrical signals.

The band pass filter 42 is configured such that a signal component of the light signal detected by the detector 13 which has a frequency of n·f0 is allowed to pass, with n being a natural number greater than 1. As described above, n is advantageously selected to be as large as possible to enhance the axial resolution. Advantageously, the band pass filter 42 has a pass band which is selected such that the transmission of signal components having frequencies of (n+1)·f0 and (n−1)·f0 through the filter is significantly damped as compared to transmission of the signal component having the frequency n·f0. To this end, the band pass filter 42 may have a pass band having a width smaller than f0.

The band pass filter 44 is configured such that a reference signal component of the reference signal detected by the first reference signal detector 11 which has a frequency of k·f0 is allowed to pass, with k being a natural number. For example, k=n−1 may be selected, such that the band pass filter 44 allows a reference signal component having the frequency (n−1)·0 to pass. Advantageously, the band pass filter 44 has a pass band which is selected such that the transmission of reference signal components having frequencies of (k+1)·f0 and (k−1)·f0 is considerably damped compared to transmission of the reference signal component having the frequency k·f0. To this end, the band pass filter 44 may have a pass band having a width which is smaller than f0.

A mixer 45 is coupled, at an input side, to the band pass filters 42 and 44 to receive the signal component 51 of the light signal and the reference signal component 52 of the reference signal. The result of frequency mixing, $$\cos(n \cdot f0 \cdot t + \Delta\phi_n) \cdot \cos((n-1) \cdot f0 \cdot t) = [\cos(f0 \cdot t + \Delta\phi_n) + \cos((2-n-1) \cdot f0 \cdot t + \Delta\phi_n)]/2, \quad (7)$$

has a low-frequency component having frequency f0, which corresponds to the fundamental frequency of the signal generated by the light source 3, and a high-frequency component.

Although the signal component of the light signal is mixed down to the fundamental frequency f0, the phase $\Delta\phi_n$ in the argument of the low-frequency component in Equation (7) is given by Equation (2), i.e., it corresponds to the phase difference for the signal component of the light signal having frequency n·f0. The low-frequency component is provided as a signal 53 to a phase evaluator 48, the second input of which is coupled to the band pass filter 47.

The band pass filter 47 is configured such that a reference signal component of the reference signal detected by the second reference signal detector 12 which has a frequency of f0 is allowed to pass. Advantageously, the band pass filter 47 has a pass band which is selected such that transmission of reference signal components having frequencies of 0·f0 and 2·f0 is considerably damped compared to the transmission of the reference signal component having frequency f0. To this end, the band pass filter 47 may have a pass band having a width smaller than f0. The resulting reference signal component having frequency f0 is provided to the phase evaluator 48 as a signal 54.

The phase evaluator 48 determines the phase difference $\Delta\phi_n$ between the signal 53 and the signal 54. As the signal component of the light signal having a frequency of n·f0 was down-converted to the frequency f0, the phase measurement can be made at low frequencies.

The amplifiers 43 and 46 in the signal processing paths can be specifically selected for the reference signal detectors 11, 12 because the signal 54 is directly captured optically with the aid of the second reference signal detector 11 rather than being generated from the signal captured by the first reference signal detector 12. For example, the amplifier 46 can be selected such that it has a good performance characteristic at frequency f0, while the amplifier 43 can be selected such that it has a good performance characteristic at frequency (n−1)·f0.

Figure 4:
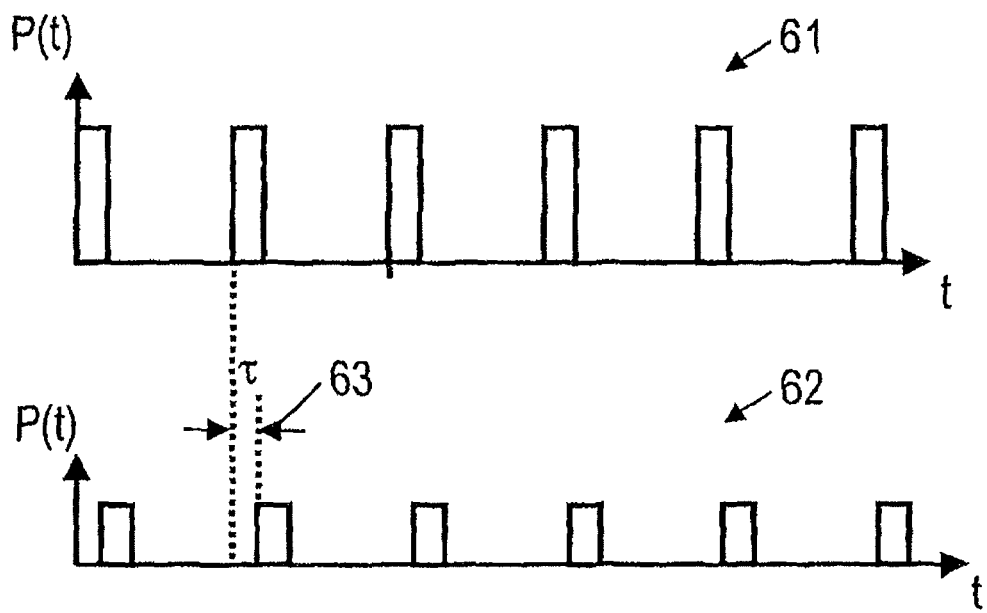
Figure 4:
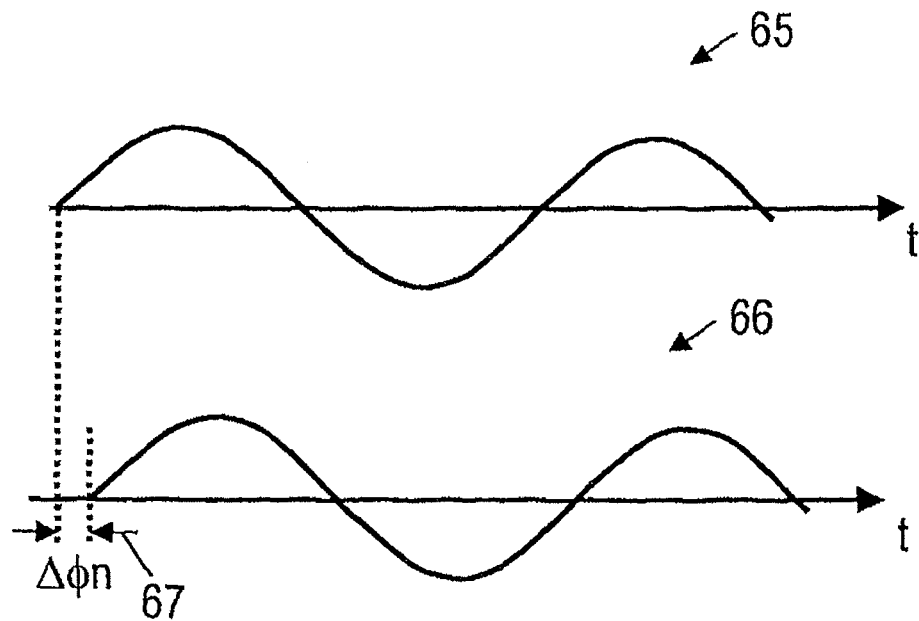

FIG. 4 illustrates various signals which occur in the detection and evaluation device of FIG. 3.

FIG. 4A shows an exemplary reference signal 61 and an exemplary light signal 62, with the light power received by the detectors 11, 12 and 13, respectively, being represented as a function of time. The light signal 62 at detector 13 has a time shift τ indicated at 63 relative to the reference signal 61.

FIG. 4B exemplarily shows signals as they may typically occur at the inputs of the phase evaluator 48. At 65, the fundamental oscillation having frequency f0, which is derived from the reference signal, is represented as a function of time, while the signal generated by down-conversion of the signal component of the light signal detected by the detector 13 is shown at 66, which latter signal also has frequency f0 but is phase-shifted by the phase $\Delta\phi_n$ relative to the fundamental oscillation derived from the reference signal. The phase difference $\Delta\phi_n$ is determined by the phase evaluator 48 in a suitable manner, for example by analog-digital conversion of the signals and subsequent fitting of the phase difference.

Figure 5:
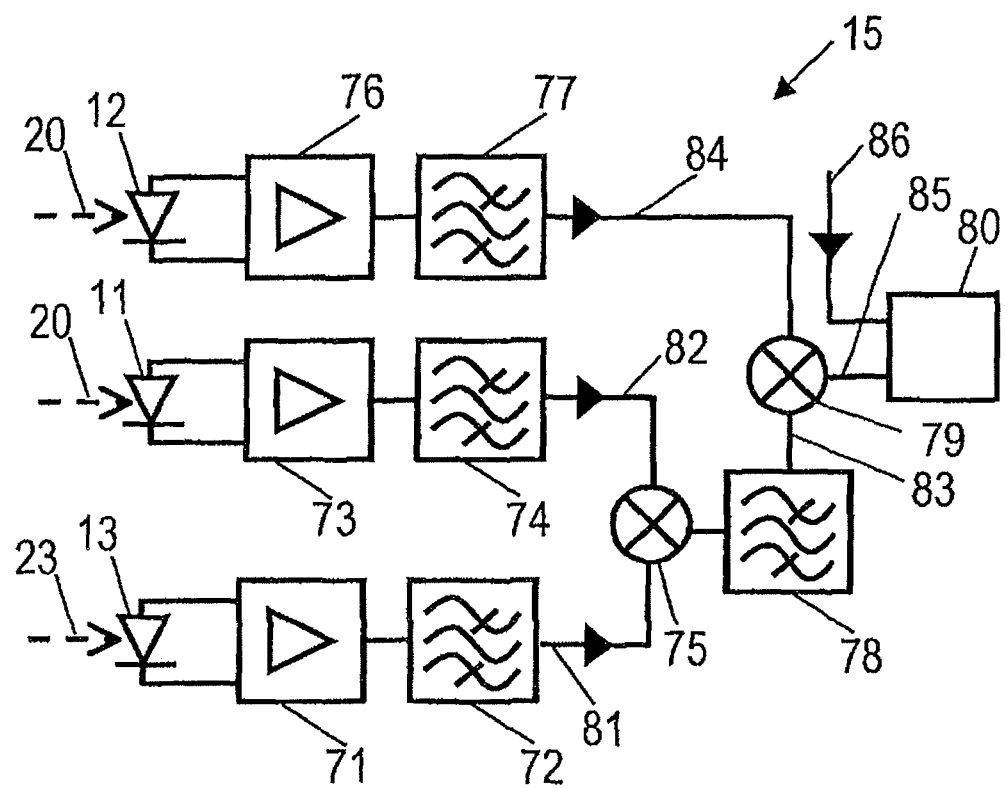
FIG. 5 shows a detection and evaluation device according to a further embodiment.

FIG. 5 shows a schematic block circuit diagram of a detector and evaluation device according to a further embodiment. The evaluation circuit 15 of the device 1 of FIG. 1 may be configured as shown in FIG. 5. The detector and evaluation device explained with reference to FIG. 5 may, however, be used not only for determining a position in a three-dimensional space, but also for distance determination, i.e. for determining a one-dimensional distance. Further, the configuration of the evaluation circuit 15 shown in FIG. 5 is only one of plural possible configurations.

Even though only the processing of the light signal from the detector 13 will be explained with reference to FIG. 5, the signals of plural detectors may be processed in a corresponding manner, with a correspondingly greater number of signal processing paths being provided. The detector 13 and the reference signal detectors 11, 12 are also shown in FIG. 5 for illustration.

The evaluation circuit 15 includes input amplifiers 71, 73, 76 in signal processing paths which are associated with the detector 13 and the reference signal detectors 11 and 12. Each one of the signal processing paths further includes a band pass filter 72, 74 and 77, respectively.

The band pass filter 72 is configured such that a signal component of the light signal detected by the detector 13 having a frequency of n·f0 is allowed to pass, with n being a natural number greater than 1. As described above, n is advantageously selected to be as large as possible to enhance the axial resolution. The band pass filter 74 is configured such that a reference signal component of the reference signal detected by the first reference signal detector 11 which has a frequency of k·f0 is allowed to pass, with k being a natural number which is selected such that |n−k|>1. The band pass filter 77 is configured such that a reference signal component of the reference signal detected by the second reference signal detector 12 which has a frequency of (|n−k|−1)·f0 or of (|n−k|+1)·f0 is allowed to pass.

The signal component 81 and the reference signal component 82, respectively, which are transmitted through the band pass filter 72 and 74, respectively, are mixed by a mixer 75. If each one of the band pass filters 72, 74 and 77 has a pass band which is sufficiently narrow having a width of less than f0, the resulting signal includes a component having a frequency of |n−k|·f0 and another higher frequency component having a frequency of (n+k)·f0, which is removed by a band pass filter 78 arranged downstream of the mixer 75. By means of the mixer 75, the phase shift $\Delta\phi_n$ of the light signal detected by the detector 13 is thus transferred onto a signal having a frequency in an intermediate frequency range at the frequency |n−k|·f0. The signal 83 in the intermediate frequency range is provided to a further mixer 79, the second input of which receives a signal 84 from the band pass filter 77, the signal 84 being the reference signal component having a frequency of (|n−k|−1)·f0, for example. By mixing the signals 83 and 84, a signal 85 is generated which has a component oscillating with the fundamental frequency f0 and having a phase shift of $\Delta\phi_n$, similarly to what has been explained with reference to Equation (7) above. A high frequency component which is also generated by the mixer 85 can be removed by a further filter if necessary.

If, as shown in FIG. 5, the signal component of the light signal detected by the detector 13 is first down-converted to an intermediate frequency, it is, however, not required for the band pass filters 72, 74 to have a pass band in which only one multiple of the fundamental frequency f0 lies. An intermediate signal which has a component with a frequency of |n−k|·f0 and essentially with a phase shift of approximately $\Delta\phi_n$ is generated by the mixer 75 even if the band pass filter 72 and/or the band pass filter 74 respectively allow plural multiples of the fundamental frequency f0, i.e. a portion of the frequency comb rather than one single harmonic, to pass. Because the phase relation of the signal component of the light signal detected by the detector 13 which has the frequency i·f0 increases linearly with i in accordance with Equation (5), the band pass filter 72 is preferably configured such that the number of harmonics in the pass band of the band pass filter 72 is small compared to n, so that the variation in phase between the harmonics remains negligible.

The band pass filters 72 and 74 are advantageously configured such that their pass bands do not overlap. In this case, the phase shift $\Delta\phi_n$ can be determined from the component of the intermediate signal output by the mixer 75 having a frequency of $|n-k|\cdot f0$ even if the frequency characteristics of the band pass filters 72 and 74 and, thus, the spectral weight of the individual harmonics in the signals 81 and 82 is not known.

For example, if $f0=100$ MHz, $n=700$ and $k=600$, and if further the pass band of the band pass filter 72 covers the frequency interval from 69.9 GHz to 70.1 GHz, so that signal components of the light signal detected by the detector 13 and having frequencies of 69.9 GHz, 70.0 GHz and 70.1 GHz are allowed to pass, and if the pass band of the band pass filter 74 covers the frequency interval from 59.9 GHz to 60.1 GHz, so that signal components of the reference signal detected by the first reference signal detector 11 and having frequencies of 59.9 GHz, 60.0 GHz and 60.1 GHz are allowed to pass, the intermediate signal output by the mixer 75 has a component having a frequency of $|n-k|\cdot f0$ and a phase shift of essentially $\Delta\phi_n$.

For a multi-stage conversion of the phase difference of the light signal detected by the detector 13 and having a frequency of $n\cdot f0$ to a signal having a low frequency via an intermediate frequency range, the requirements imposed on the widths of the pass bands of the band pass filters 72, 74, which lies at higher frequencies than the pass bands of the band pass filters 77 and 78, are thus less strict than for a one-stage mixing process, because the pass band of the band pass filters is allowed to transmit plural harmonics. With the pass band of the band pass filters 77 and 78 being located at lower frequencies, at 10.0 GHz for the band pass filter 78 and at 9.9 GHz for the band pass filter 77 in the above example in which $f0=100$ MHz, $n=700$ and $k=600$, it is easier to configure these band pass filters 77, 78 such that they have a narrow pass band, rather than the band pass filter 72, 74 having a pass band at higher frequencies of 60 or 70 GHz, for example.

The further mixer 79 is coupled, at an output side, to a phase evaluator 80, the second input of which receives a signal 86 oscillating with the fundamental frequency f0. The signal 86 may be provided by a sync output of the light source 3 of the device 1 of FIG. 1, for example. Alternatively, the signal 86 may also be generated using a filter which receives the reference signal detected by the second or first reference signal detector and which allows the reference signal component having frequency f0 to pass, as illustrated in FIG. 3

As explained with reference to FIG. 1-5, in the device 1 of FIG. 1 the distance of an object from a plurality of reference points can be determined via the phase shift of a harmonic of the light signal. In the device of FIG. 1, the reference points are given by the virtual points of origin of the light cones 22 and 27.

Figure 6:
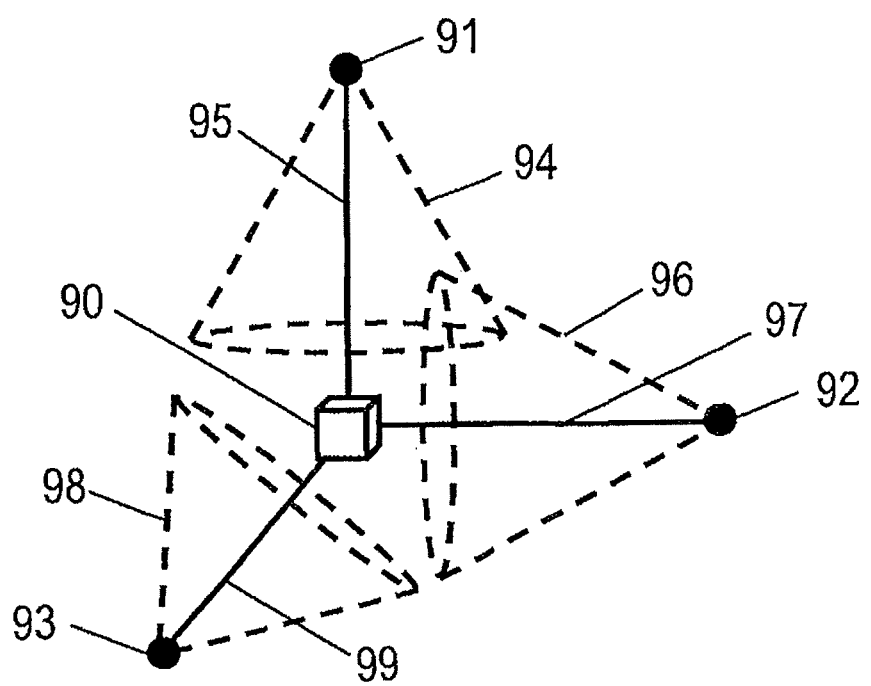
FIG. 6 illustrates determining a position with the device of FIG. 1.

FIG. 6 illustrates determining the position of an object based on distances from a plurality of reference points.

The object 90 is located in the overlap region of plural light cones 94, 96, 98, which are irradiated into the spatial region in which the object 90 is located originating at known reference points 91, 92 and 93. Distances 95, 97 and 99 of the object 90 from each one of the known reference points 91, 92 and 93 are determined in the manner described with reference to FIG. 1-5 above. The position of the object 90 can then be determined by means of trileration, for example using algorithms as used in the global positioning system GPS, relative to the reference points 91, 92 and 93 and thus, by a suitable coordinate transformation, in an arbitrary coordinate system. While only three reference points are schematically shown in FIG. 6, the precision of position determination can be enhanced by using additional detectors and reference points, respectively. Using more than three detectors may also be advantageous for non-cooperative surfaces, which may for example have small scattering cones and/or if shadowing is expected within the spatial region.

For the device 1 of FIG. 1, the computation of the position of the object may be made by the evaluation circuit 15 or by a separate computing unit.

While the same harmonic of the sequence of light pulses may respectively be used for measuring the distances 95, 97 and 99 of the object 90 from each one of the known reference points 91, 92 and 93, the distance measurement from different reference points 91, 92 and 93 can also be made based on different harmonics and, thus, with different accuracy. This may for example be made in applications in which the object can take only one of plural discrete positions in one of three spatial directions and where it is only required to know in which one of the discrete positions the object is.

While, with reference to FIG. 1-6, the determination of an object position using a device and a method has been described in which a retroreflector reflects a sequence of light pulses directed into the spatial region from plural reference points into plural different directions, a position determination may also be made in that plural retroreflectors provided on the object reflect a sequence of light pulses, as will be explained in more detail in the following. Hereby, it is not required, while still possible, to direct light into the spatial region from plural reference points.

Figure 7:
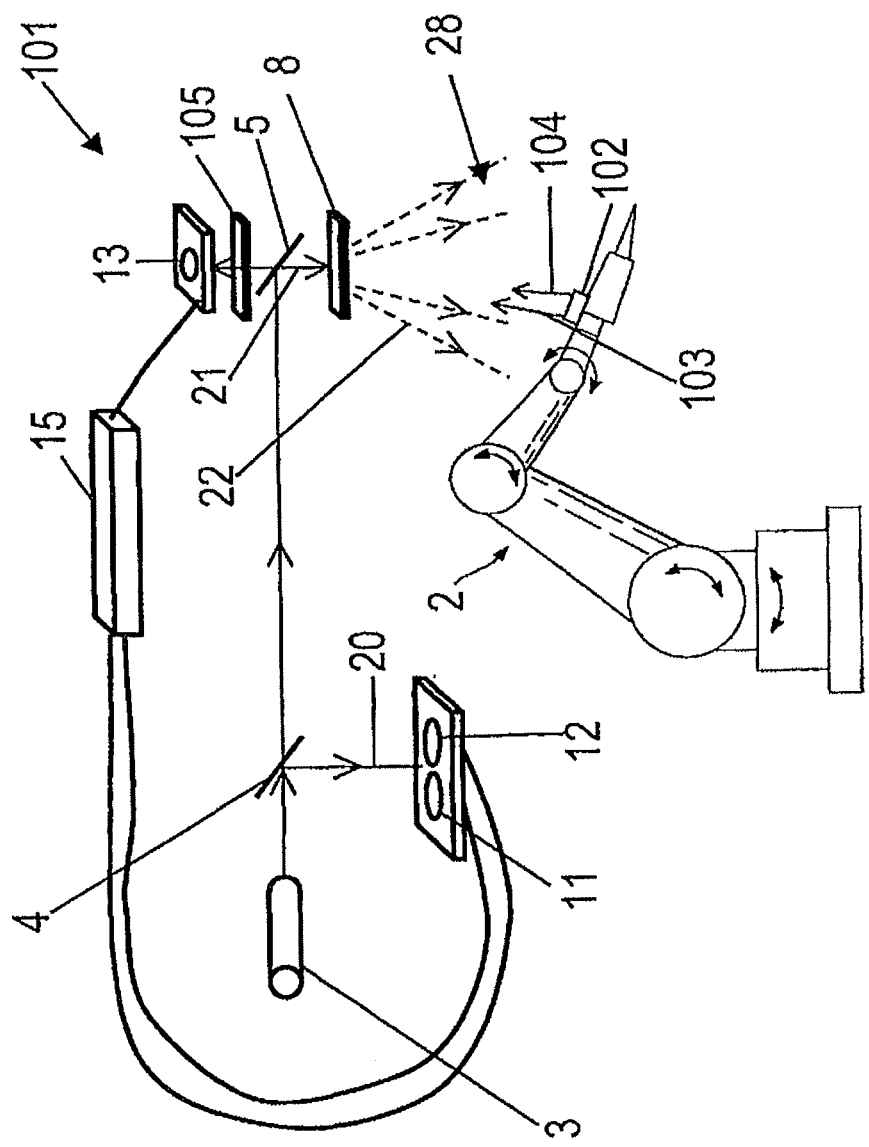
FIG. 7 is a schematic representation of a device according to a further embodiment.

FIG. 7 shows a device 101 for determining a position of an object according to a further embodiment. Components which are identical to and have the same function as components described with reference to FIG. 1 are designated with the same reference numeral in FIG. 7. In the following, only the differences between the device 101 and the device 1 will be explained in detail.

In the device 101, a light directing device has a beam splitter 4, a beam splitter 5 and a light expander 8. Via the beam splitter 5 and the light expander 8, a sequence of light pulses generated by the signal source 3 is irradiated in a light cone 22 into a spatial region 28 in which the position of an object is to be determined.

A positioning member 102 which has a plurality of retroreflectors spaced from each other and having known positions relative to each other is provided on the robot arm 2. The plural retroreflectors reflect the sequence of light pulses irradiated in the light cone 22 as light signals 103 and 104, respectively, back towards the beam splitter 4. The light signals 103 and 104, respectively, are detected by the detector 13. As described with reference to FIG. 1-5 above, the distance of the various retroreflectors of the positioning member 102 from the beam passage point of the beam splitter 5 or from the virtual point of origin of the light cone 22 can be determined in that the evaluation circuit 15 determines a phase difference between signal components of the light signals 103 and 104, respectively, and a reference signal 20 directed to reference signal detectors 11, 12. The determination of the phase difference is again made using signal components having a frequency which corresponds to a harmonic of the irradiated sequence of light pulses with a frequency of $n\cdot f0$.

Because the plural retroreflectors are spaced from each other, the light signals 103 and 104, respectively, which are reflected by the respective retroreflectors of the positioning member 102 towards the detector 13, are reflected into different directions, i.e. with different wave vectors, and generally cover different optical path lengths which are a consequence of the different distances of the retroreflectors from the beam passage point of the beam splitter 5. These distances of the plural retroreflectors from a reference point can be determined from the phase differences, which are determined by the evaluation circuit 15. The position of the object can be determined from the distances of the retroreflectors from the reference point and the known relative positions of the retroreflectors to each other. If all three coordinates of the object are to be determined, the positioning member in the device 101 shown in FIG. 7 has at least three retroreflectors which are not located on a straight line, and the position of the object can be determined by means of trilateration. If the object can move in a plane only, it is also possible that only two retroreflectors are provided on the positioning member 102, to determine the two unknown coordinates of the object.

Figure 8:
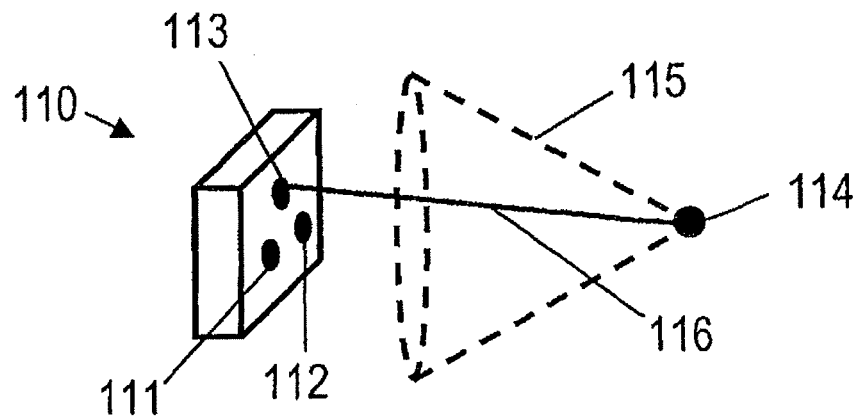
FIG. 8 illustrates determining a position with the device of FIG. 7.

FIG. 8 shows a possible configuration of a positioning member 110 which may be used as positioning member 102 in the device 101 of FIG. 7. The positioning member 110 is provided with three retroreflectors 111, 112 and 113. A sequence of light pulses is irradiated onto the positioning member 110 in a light cone 115 from a reference point 114. As described with reference to FIG. 1-5 above, a distance 116 of the retroreflector 113 from the reference point 114 can be determined by evaluating the phase relation of the light reflected by the retroreflector 113.

In order to allow the distances of all retroreflectors 111, 112 and 113 from the reference point 114 to be determined in this manner, the positioning member 110 is configured such that light signals which originate from the retroreflectors 111, 112 and 113 can be distinguished by the detector 13 and/or by the evaluation circuit 15. In one possible implementation this is attained in that the positioning member 110 has an alterable configuration which is altered in a controllable manner, for example using a control signal or in accordance with a given time flow chart.

FIG. 9A shows an implementation of the positioning member 110 having an alterable configuration, which may be used as a positioning member 102 in the device 101 of FIG. 7. FIG. 9A shows a schematic exploded view and FIG. 9B shows a plan view of the positioning member 110.

The positioning member 110 is provided with a beam interrupter which, in the illustrated implementation, is configured as a light proof disc 117 having an opening 118. The disc 117 covers at least two retroreflectors 111 and 112 at any time. If the position of a retroreflector is to be determined, the disc 117 is positioned by a rotation 119 such that the opening 118 is arranged adjacent to the retroreflector, the position of which is to be determined. By means of a controlled rotation of the disc 117, the distances of the retroreflectors 111, 112 and 113 from a reference point can be determined sequentially. The frequency at which the configuration of the positioning member 110 is altered may be suitably selected in dependence on the expected motion speeds of the object in order to allow tracking of the object position in close to real time.

Other implementations of the positioning member 110 having an alterable configuration are also possible. For example, a stopper or shutter, respectively, can be arranged in front of each one of the retroreflectors 111, 112 and 113 instead of the rotatable disc 117, wherein the shutters can be opened and closed in a controllable manner to unblock and block, respectively, the associated retroreflectors 111, 112 and 113.

The evaluation circuit 15 of the device 101 of FIG. 7 is configured to sequentially process light signals which have been reflected back towards the detector 13 by the different retroreflectors. In this case, each one of the light signals comprises a train of light pulses, i.e. the configuration of the positioning member 110 is altered only over time scales which are long compared to T0.

Figure 9:
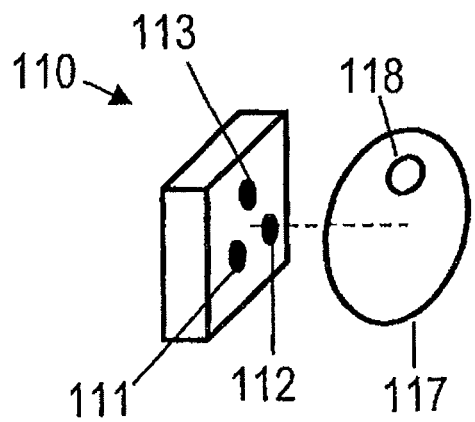
FIG. 9A shows a schematic exploded view and FIG. 9B shows a plan view of a reflector arrangement having a controllable beam interrupter.
Figure 9:
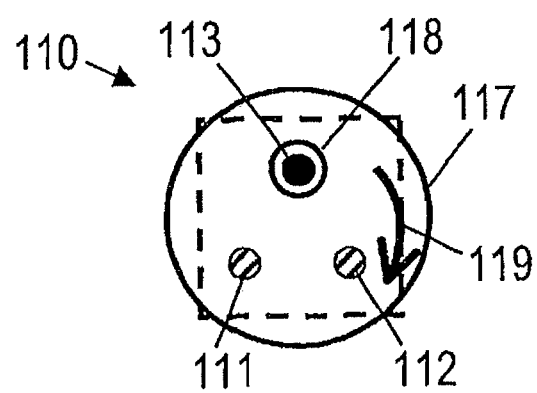

While the position determination using plural retroreflectors in one single light cone has been described for the device explained with reference to FIGS. 7-9, it is also possible to use plural light cones in combination with plural retroreflectors. It is thus possible to combine the methods for position determination described with reference to FIGS. 1-6 and FIGS. 7-9, respectively.

The use of plural reflectors may for example be desired in cases in which not only the coordinates of a given object point, but additionally also the orientation of the object is to be determined. An example for this is a mechanical probe head for which the orientation of its shaft is to be optically detected, in addition to the coordinates of a point of the probe head. To this end, at least two retroreflectors can be mounted and three beam cones can be used. It is also possible that three retroreflectors are provided on the probe head if plural tilt angles are to be determined in a configuration having three beam cones.

Figure 10:
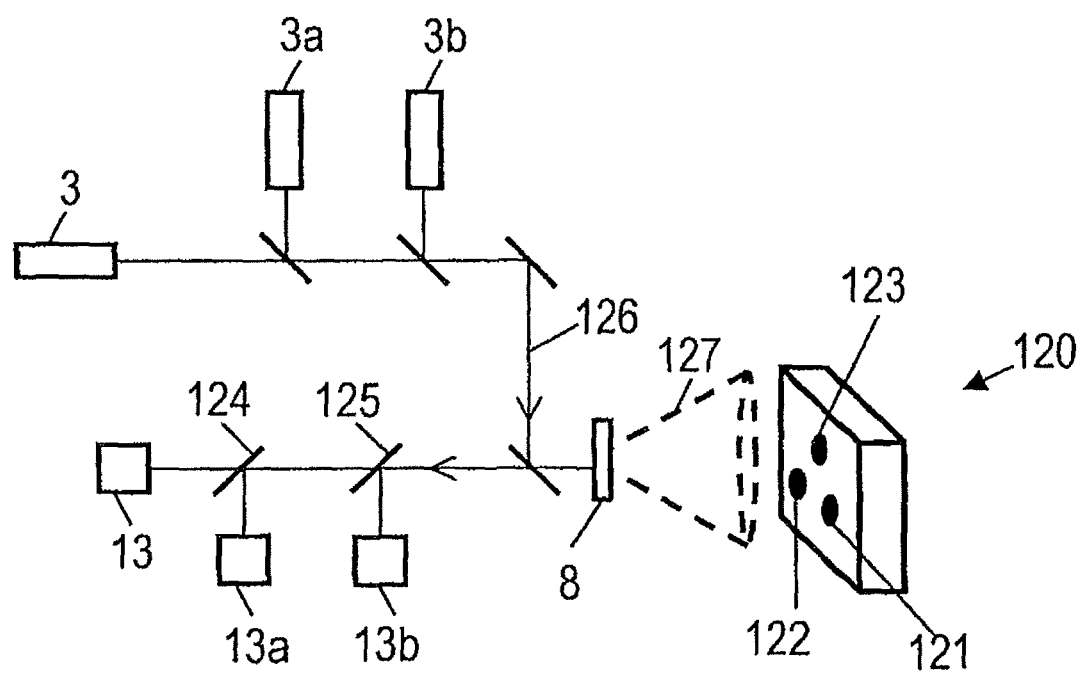
FIG. 10 is a schematic representation of a device according to a further embodiment.

FIG. 10 is a schematic representation of a device 120 for determining a position of an object according to a further embodiment. Here, components of the device 120 which have an operation that is identical or similar to that of components already explained with reference to FIGS. 1-9 are designated with the same or similar reference numerals and are not any more explained in detail here.

The device 120 has three light sources 3, 3a, 3b, each of which generates a sequence of short light pulses. Each one of the light sources can be configured as described for the light source 3 with reference to FIGS. 1-5. The light wavelengths $\lambda_1, \lambda_2$ and $\lambda_3$ of the beams generated by the three light sources are pair-wise different. The repetition rate of the sequences of light pulses generated by the three light sources 3, 3a, 3b may be identical, but may also be selected to be different. The output signals of the three light sources 3, 3a, 3b are combined to a beam 126 and are irradiated in a light cone 127 into the spatial region in which the position of the object is to be determined.

The device 120 further has three reflectors 121, 122, 123, which have wavelength selective reflection characteristics. For example, reflector 121 has a higher reflection for light having a wavelength $\lambda_1$ than for light having the wavelengths $\lambda_2$ and $\lambda_3$, while reflector 122 has a higher reflection for light having wavelength $\lambda_2$ than for light having the wavelengths $\lambda_1$ and $\lambda_3$, and reflector 123 has a higher reflection for light having wavelength $\lambda_3$ than for light having the wavelengths $\lambda_1$ and $\lambda_2$.

The device 120 further has two dichroic beam splitter or dichroic mirrors 124 and 125, respectively, and three detectors 13, 13a, 13b. The sequences of light pulses having light wavelengths $\lambda_1, \lambda_2$ and $\lambda_3$, which are reflected by the reflectors 121, 122 and 123, are directed onto the dichroic mirror 125, which directs the sequence of light pulses reflected by the reflector 121 and having the light wavelength $\lambda_1$ to the detector 13b. The beam transmitted by the dichroic mirror 125 impinges onto the dichroic mirror 124, which directs the sequence of light pulses reflected by the reflector 122 and having the light wavelength $\lambda_2$ to the detector 13a. The beam transmitted by the dichroic mirror 124 is detected by the detector 13.

The output signal of each one of the detectors 13, 13a, 13b can be processed as described above for the output signal of the detectors 13 and 14 in FIGS. 1-8, to determine the distances of the three reflectors 121, 122, 123 from the virtual point of origin of the light cone 127. The position of the object can be determined based on the thus determined distances, as described with reference to FIG. 8.

In the device 120, the determination of the object position is made based on the distances of plural reflectors 121, 122, 123 from one reference point. Based on the wavelength selectivity of the reflection characteristics, the distances of the three reflectors may be determined simultaneously.

For the devices and methods explained with reference to FIG. 1-10 above, useful signals impinge onto the photodetectors 11, 12, 13 and 14, which are short pulses. The pulse duration can for example be 100 fs. The time interval T0 between successive pulses is given by the reciprocal of the repetition rate. For example, for f0=100 MHz, T0 is 10 ns. For the mentioned exemplary values, a useful signal arrives at the detectors 11, 12, 13 and 14 only in a time interval, the length of which is 100 fs/10 ns=1/10$^5$ of the period T0 between successive light pulses. There is a very long time span in which no useful signal arrives at the photo receivers.

The devices 1, 101 and 120 can therefore be configured such that in time intervals in which none of the light pulses generated by the light source 3 can arrive at the photo receivers 11, 12, 13 and 14, respectively, and 13, 13a, 13b, light incidence onto the photo receivers is blocked and/or a signal processing of the signal output by the photo receivers 11, 12, 13 and 14, respectively, and 13, 13a, 13b to the evaluation circuit is blocked with a blocking device. For the device 101 of FIG. 7, a light interrupter 105 arranged in the beam path between the beam splitter 5 and the detector 13 is exemplarily illustrated. Such light interrupters may also be provided in front of all other detectors 11, 12 and 14 and 13, 13a, 13b, respectively, of the devices 1, 101 and 120. Alternatively or additionally, elements which can be switched fast may be provided in the signal processing paths of the evaluation circuit 15, which unblock the signal processing paths in the time intervals in which no light pulses can impinge on the associated detector.

Noise which could contribute to a degradation of the signal-to-noise ratio during the time interval in which no useful signal is processed can be suppressed by such a selective deactivation of signal processing. The rather short time interval in which signals are detected and processed, i.e. the unblocking time for allowing a useful pulse to pass, is selected in dependence on the repetition rate and the expected maximum difference in propagation time between near point and far point of a measuring segment so as to ensure that each one of the light pulses is detected and processed.

Figure 11:
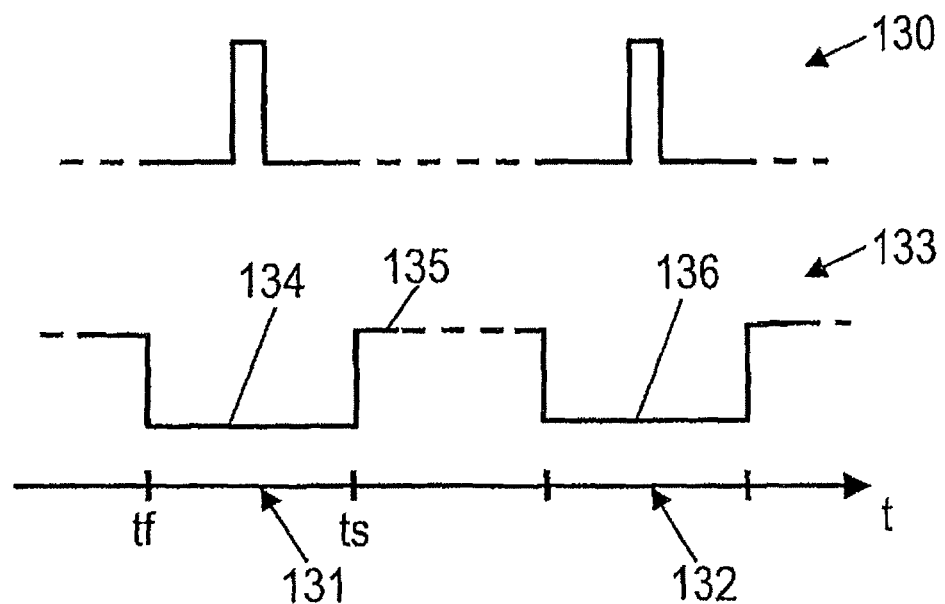
FIG. 11 illustrates a time-dependent actuation of a blocking device in the device of FIG. 7.

FIG. 11 exemplarily shows a useful signal 130 of a sequence of light pulses having a long time period between the light pulses. FIG. 11 further shows a switching state 133 of a blocking device which allows signal detection and/or signal processing only in time intervals 131 and 132 in which a light pulse can arrive. In this case, the limits of the time interval 131 are given by the earliest possible time of arrival tf of a light pulse and the latest possible time of arrival is of the light pulse. In the time intervals 131 and 132, the blocking device has a switching state 134 and 136, respectively, which allows signal detection and signal processing, while the blocking device has a switching state 135 in which signal detection and/or signal processing are suppressed at any other time.

Figure 12:
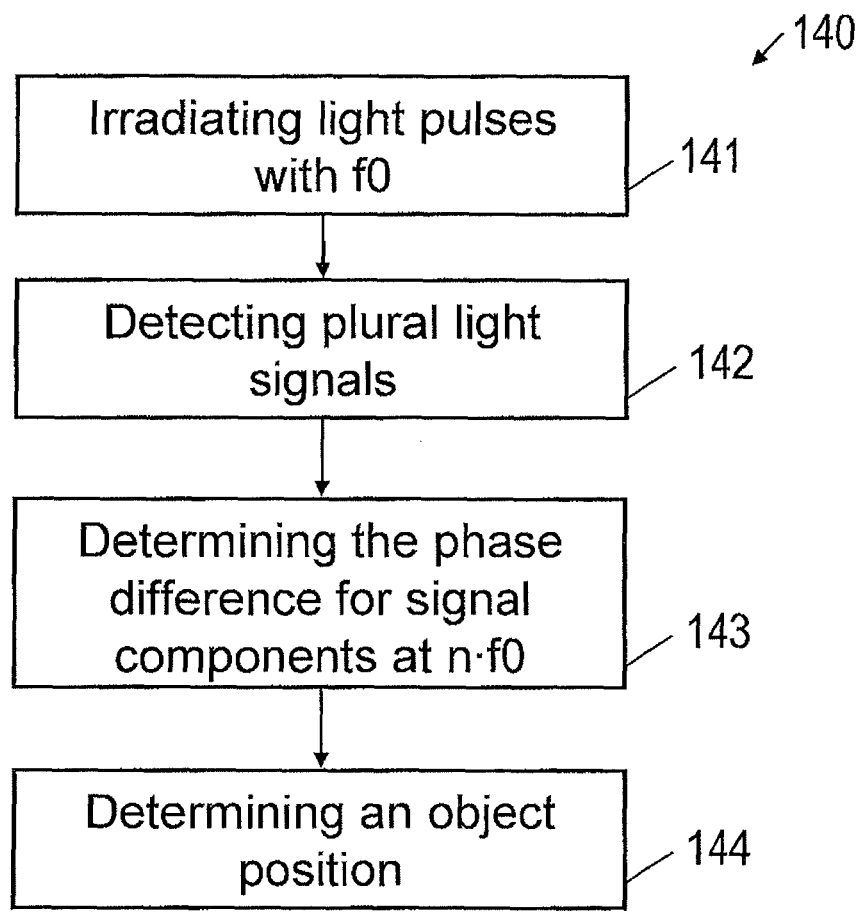
FIG. 12 is a flow chart representation of a method according to an embodiment.

FIG. 12 is flow chart representation of a method 140 for determining a position of an object in a spatial region. The method may be performed using the device 1 explained with reference to FIG. 1-5, the device 101 explained with reference to FIG. 7-9, the device 120 explained with reference to FIG. 10 or a device according to another embodiment.

At 141, a sequence of light pulses having a repetition rate is irradiated into a spatial region. The sequence of light pulses may be directed into the spatial region from a plurality of reference points, as shown in FIG. 1, or can be directed into the spatial region from one reference point, as shown in FIG. 7 and FIG. 10.

At 142, plural light signals from the spatial region are detected. The light signals originate due to reflection and/or scattering of the irradiated sequence of light pulses on the object. The light signals are reflected and/or scattered into different directions within the spatial region. The light signals can be reflected and/or scattered by one retroreflector towards plural detectors, as shown in FIG. 1, or by plural retroreflectors towards one detector, as shown in FIG. 7, or by plural retroreflectors towards plural detectors, as shown in FIG. 10.

At 143, a phase shift of a signal component of the light signal is determined for each one of the light signals, the signal component being selected such that it has a frequency which corresponds to a multiple n·f0 of the repetition rate f0. The signal component may be selected from the detected light signals using a band pass filter. The phase shift may be determined in relation to a reference signal component which has a frequency which also corresponds to the multiple n·f0 of the repetition rate f0.

At 144, the position of the object is determined based on the determined phase differences. In this case, the coordinates of a specified object point and/or angular coordinates which define the orientation of the object can be determined.

As has been explained in connection with Equations (2)-(6), determining the object position at 144 may require that a sufficiently good estimation value for distances between the object and the reference points exists already, so that Equation (3) is fulfilled. This may for example be attained in that the object position is first estimated using a less precise method, for example using plural cameras in combination with a triangulation method.

In a further embodiment, method steps of the method 140 may be repeated iteratively, with signal components having higher frequency being evaluated with an increasing iteration count. This can be implemented using a suitable configuration of the evaluation circuit 15 in FIGS. 1 and 7.

Figure 13:
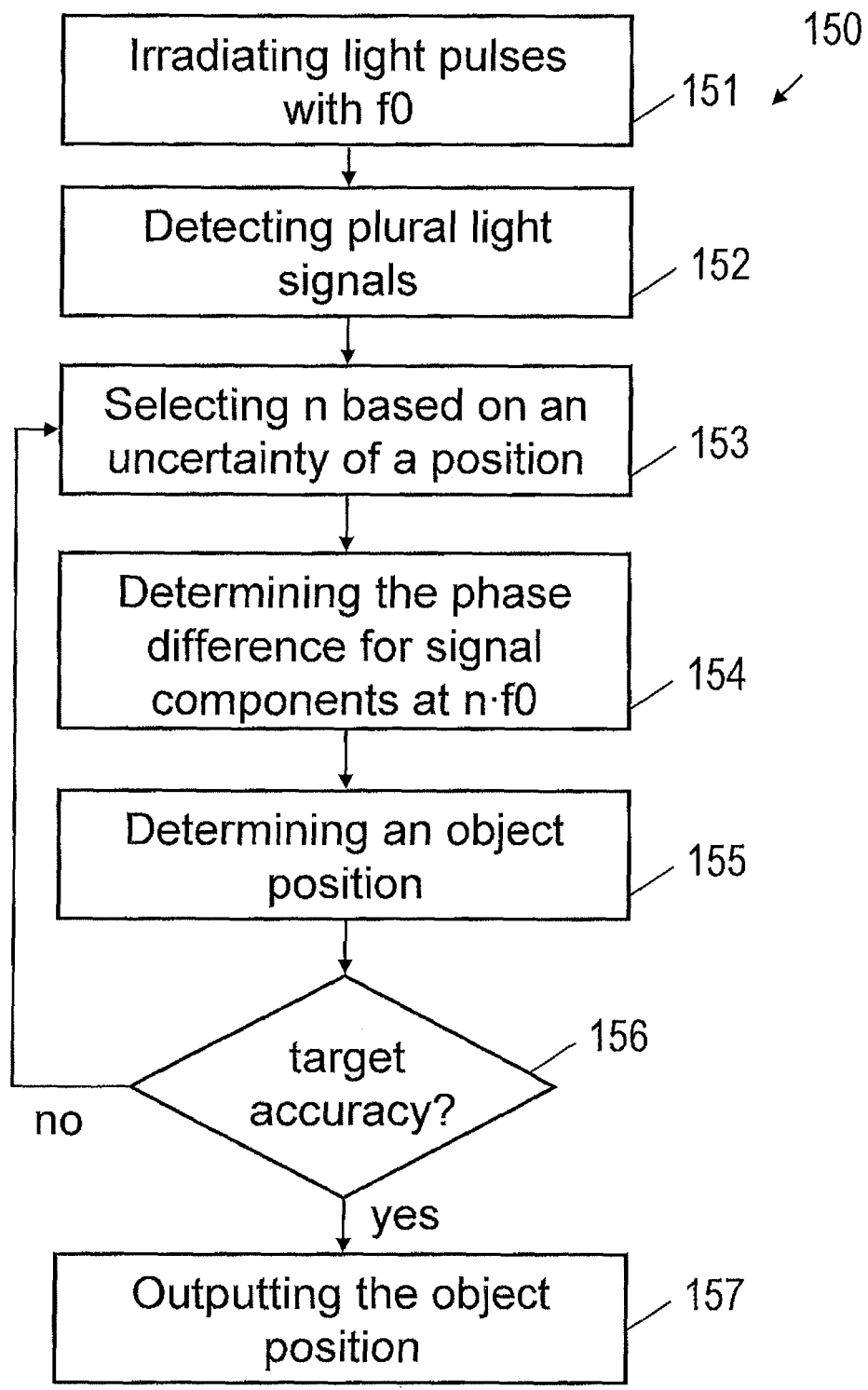
FIG. 13 is a flow chart representation of a method according to a further embodiment.

FIG. 13 is a flow chart representation of a method 150 for determining a position of an object in a spatial region, which is based on the method 140 of FIG. 12 and in which the accuracy of position determination is improved iteratively.

At 151 and 152, a sequence of light pulses is irradiated and the sequence of light pulses reflected and/or scattered by the object is detected, as in steps 141 and 142 of the method 140.

At 153, a natural number n is selected, with the phase difference being subsequently determined for the signal component having frequency n·f0. The number n is here selected as a function of the current uncertainty on the object position or an accuracy of an estimation value for the object position that is already available, respectively, so that Equation (3) is fulfilled. At the first iteration, n=1 may also be selected.

The subsequent steps 154 and 155 are implemented in the same way as steps 143 and 144 of the method 140, with an improved object position being determined based on the phase differences of the signal components having frequency n·f0 of plural light signals.

At 156, it is verified whether the object position has been determined with sufficient accuracy. If it is determined at 156 that the object position has been determined with sufficient accuracy, at 157 the most recently determined object position is output and/or processed further. Otherwise, the method returns to step 153, where a larger value n can now be selected for the next iteration.

The devices and methods according to various embodiments of the invention allow a fast position determination with a high spatial resolution, which is suitable for determining more than one coordinate of the object. The devices and methods may generally be used for determining object positions in a spatial region, with exemplary fields of application being measurement applications in industrial plants, such as in automated production or transportation plants or the like.

The invention claimed is:

1. A device for determining a position of an object in a spatial region, comprising: a light source for generating a sequence of light pulses with a repetition rate, a power of said sequence of light pulses having a plurality of spectral components spaced in frequency by the repetition rate; a light directing device arranged to direct a portion of a light pulse of said sequence of light pulses into said spatial region; a detector arrangement configured to detect a plurality of light signals which, within said spatial region, are reflected and/or scattered into a plurality of different directions; and an evaluation circuit coupled to said detector arrangement and having a reference signal input for receiving a reference signal, said evaluation circuit being configured to determine, for each light signal of said plurality of light signals detected by said detector arrangement, an associated phase difference between said reference signal and a signal component of the respective light signal, said signal component respectively having a frequency which corresponds to a multiple of said repetition rate, said position of said object being determined based on said phase differences associated with said plurality of light signals; and wherein said evaluation circuit comprising:
   a mixer having an input to receive said signal component and further having an output, and
   a further mixer having a further input coupled to the output of the mixer.

2. The device according to claim 1, said light directing device being arranged to direct another portion of said light pulse of said sequence of light pulses to at least one reference signal detector as a reference signal, said reference signal input of said evaluation circuit being coupled to said at least one reference signal detector to receive said reference signal detected by said at least one reference signal detector.

3. The device according to claim 1, said detector arrangement comprising a plurality of optical detectors which are arranged to respectively detect one light signal of said plurality of light signals, said light directing device comprising a plurality of beam splitters to receive said sequence of light pulses and to direct it into said spatial region, said plurality of optical detectors being arranged such that an optical detector of said plurality of optical detectors receives a light signal from said spatial region via an associated beam splitter of said plurality of beam splitters, said optical detector of said plurality of optical detectors being arranged to receive a portion of said sequence of light pulses which was directed into said spatial region by said associated beam splitter and reflected and/or scattered within said spatial region, said plurality of beam splitters comprising at least three beam splitters which are not arranged on a straight line.

4. The device according to claim 1, said detector arrangement comprising an optical detector configured to receive said plurality of light signals in a sequential manner.

5. The device according to claim 4, comprising a positioning member to be mounted on said object, wherein light reflecting and/or light scattering characteristics of said positioning member are alterable, wherein said positioning member comprises a plurality of reflectors and a mechanism to selectively conceal at least one of said plurality of reflectors.

6. The device according to claim 1, said light directing device comprising at least one light expander for expanding said portion of said sequence of light pulses which is to be directed into said spatial region.

7. The device according to claim 1, said evaluation circuit being configured to, in order to determine the phase differences associated with said plurality of light signals, respectively mix down said signal components of said plurality of light signals in plural stages, wherein, in order to mix down said signal components in plural stages, the signal component is respectively mixed with a reference signal component of a reference signal which is generated based on the sequence of light pulses.

8. The device according to claim 1, said evaluation circuit being configured to respectively determine, in an iterative manner, an associated phase difference for plural signal components of a light signal, said plural signal components of the light signal having different frequencies, at least one of said plural signal components of the light signal having a frequency which corresponds to a multiple of said repetition rate.

9. The device according to claim 1, said device having a blocking device to suppress incidence of light onto said detector arrangement and/or processing of signals by said evaluation circuit during a time interval which is determined based at least on said repetition rate of said sequence of light pulses.

10. The device according to claim 1, said light source comprising a short-pulse laser.

11. The device according to claim 1, said device being an industrial coordinate measuring machine or a device for determining a position of a robot.

12. A method for determining a position of an object in a spatial region, comprising:
   irradiating a sequence of light pulses with a repetition rate into said spatial region wherein a power of said sequence of light pulses has a plurality of spectral components spaced in frequency by the repetition rate;
   detecting a plurality of light signals which are reflected and/or scattered into a plurality of different directions, due to reflection and/or scattering of said irradiated sequence of light pulses by said object in said spatial region wherein, for each light signal of said plurality of light signals, an associated phase difference between said irradiated sequence of light pulses and a signal component of the respective light signal is determined, said signal component respectively having a frequency which corresponds to a multiple of said repetition rate; said signal component being supplied to a mixer having an output coupled to a further mixer to determine said associated phase change difference; and wherein said position of said object is determined based on said phase differences associated with said plurality of light signals.

13. The method according to claim 12, wherein at least three spatial coordinates of said object are determined, and wherein said sequence of light pulses is irradiated into said spatial region from a plurality of irradiation points which are not located on a straight line.

14. The method according to claim 12, wherein said signal components of said plurality of light signals are respectively mixed down in plural stages to determine said phase differences associated with said plurality of light signals, wherein said signal components, for down-conversion, are respectively mixed with a reference signal component of a reference signal which is generated based on said sequence of light pulses.

15. The method according to claim 12, wherein said method is performed using said device of claim 1.

16. The method according to claim 1 wherein the phase difference is determined for a signal component respectively having a frequency which corresponds to an integer multiple of said repetition rate.

17. The method according to claim 12 wherein the phase difference is determined for a signal component respectively having a frequency which corresponds to an integer multiple of said repetition rate.

18. The method according to claim 1 wherein the light signals detected by the detector arrangement are return light signals generated by scattering or reflection of the sequence of light pulses in the spatial region.

19. The method according to claim 12 wherein the light signals detected by the detector arrangement are return light signals generated by scattering or reflection of the sequence of light pulses in the spatial region.

20. The device according to claim 1, wherein said evaluation circuit further comprises a filter having a pass band which allows one of the spectral components to pass through the filter while attenuating at least another one of the spectral components.

\* \* \* \* \*

UNITED STATES PATENT AND TRADEMARK OFFICE
CERTIFICATE OF CORRECTION

PATENT NO. : 9,175,947 B2  
APPLICATION NO. : 13/061786  
DATED : November 3, 2015  
INVENTOR(S) : Cristina Alvarez Diez et al.

Page 1 of 1

It is certified that error appears in the above-identified patent and that said Letters Patent is hereby corrected as shown below:

In the specification,

Column 13, line 20: "$d'=c\cdot\Delta\varphi i'(2\cdot\pi i\cdot f0)$" should read -- $d'=c\cdot\Delta\varphi_i'/(2\cdot\pi\cdot i\cdot f0)$ --.

Column 14, lines 66-67: "$\cos(n\cdot f0\cdot t+\Delta\varphi_n)\cdot\cos((n-1)\cdot f0\cdot t) = [\cos(f0+t+\Delta\varphi_n)+\cos((2-n-1)\cdot f0\cdot t+\Delta\varphi_n)]/2$" should read -- $\cos(n\cdot f0\cdot t+\Delta\varphi_n)\cdot\cos((n-1)\cdot f0\cdot t) = [\cos(f0\cdot t+\Delta\varphi_n)+\cos((2\cdot n-1)\cdot f0\cdot t+\Delta\varphi_n)]/2$ --.

In the claims,

Column 24, line 51 (Claim 12): "associated phase change difference" should read -- associated phase difference --.

Column 25, line 3 (Claim 16): "The method according to claim 1" should read -- The device according to claim 1 --.

Column 25, line 11 (Claim 18): "The method according to claim 1" should read -- The device according to claim 1 --.

Signed and Sealed this
Fifth Day of April, 2016

Michelle K. Lee
*Director of the United States Patent and Trademark Office*